US010196068B2

(12) United States Patent
Yoo

(10) Patent No.: US 10,196,068 B2
(45) Date of Patent: Feb. 5, 2019

(54) CONVENIENCE APPARATUS FOR VEHICLE AND VEHICLE

(71) Applicant: LG ELECTRONICS INC., Seoul (KR)

(72) Inventor: Wonseok Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/288,160

(22) Filed: Oct. 7, 2016

(65) Prior Publication Data
US 2017/0101110 A1    Apr. 13, 2017

(30) Foreign Application Priority Data
Oct. 8, 2015    (KR) ......................... 10-2015-0141719

(51) Int. Cl.
B60W 50/08    (2012.01)
B60W 10/18    (2012.01)
B60W 10/20    (2006.01)
B60R 25/24    (2013.01)

(52) U.S. Cl.
CPC ........... *B60W 50/08* (2013.01); *B60R 25/245* (2013.01); *B60W 10/18* (2013.01); *B60W 10/20* (2013.01); *B60W 2540/04* (2013.01)

(58) Field of Classification Search
None
See application file for complete search history.

(56) References Cited

U.S. PATENT DOCUMENTS

| 8,581,712 | B2 * | 11/2013 | Morgan | B60R 25/04 340/426.18 |
| 9,473,890 | B1 * | 10/2016 | Liu | G01S 5/0284 |
| 9,738,294 | B2 * | 8/2017 | Shubs, Jr. | B61L 27/04 |
| 9,792,613 | B2 * | 10/2017 | Gong | H04L 63/101 |
| 9,805,607 | B2 * | 10/2017 | Gong | H04L 63/101 |

(Continued)

FOREIGN PATENT DOCUMENTS

| DE | 102011111600 | 2/2013 |
| EP | 2560150 | 2/2013 |

(Continued)

OTHER PUBLICATIONS

Machine translation of CN101668653 B.*
(Continued)

*Primary Examiner* — Jean Paul Cass
(74) *Attorney, Agent, or Firm* — Fish & Richardson P.C.

(57) ABSTRACT

A convenience apparatus for a vehicle includes a user sensing unit configured to sense a user located outside the vehicle; an object sensing unit configured to sense an object other than the user located outside the vehicle; and a processor. The processor is configured to determine at least one geo-fence established around the vehicle; determine, based on the user sensing unit sensing the user outside the vehicle, whether an entrance event or an exit event of the user has occurred based on the at least one geo-fence; determine that the object sensing unit has sensed an object outside the vehicle; and based on determining that the object sensing unit has sensed the object outside the vehicle and that the entrance or exit event of the user has occurred, provide a signal that controls an operation of the vehicle according to the entrance or exit event of the user.

17 Claims, 20 Drawing Sheets

(56) References Cited

U.S. PATENT DOCUMENTS

| | | | | |
|---|---|---|---|---|
| 2005/0109882 | A1* | 5/2005 | Armbruster | B61L 3/006 246/167 R |
| 2010/0148947 | A1* | 6/2010 | Morgan | B60R 25/04 340/426.22 |
| 2012/0056734 | A1 | 3/2012 | Ikeda et al. | |
| 2013/0138714 | A1* | 5/2013 | Ricci | H04W 4/90 709/201 |
| 2014/0142783 | A1* | 5/2014 | Grimm | G06F 17/00 701/2 |
| 2014/0207344 | A1* | 7/2014 | Ihlenburg | E05F 15/73 701/49 |
| 2015/0346968 | A1* | 12/2015 | Johnson | G01C 21/00 715/771 |
| 2016/0269456 | A1* | 9/2016 | Ricci | H04L 65/4069 |
| 2016/0269469 | A1* | 9/2016 | Ricci | H04L 67/025 |
| 2017/0011210 | A1* | 1/2017 | Cheong | H04W 12/06 |
| 2017/0129514 | A1* | 5/2017 | Shubs, Jr. | B61L 27/04 |
| 2017/0146970 | A1* | 5/2017 | Joo | G05B 19/0428 |
| 2017/0154386 | A1* | 6/2017 | Hemmati | G06Q 50/04 |
| 2017/0169713 | A1* | 6/2017 | Gong | H04L 63/101 |
| 2017/0287006 | A1* | 10/2017 | Azmoodeh | G06Q 30/0261 |

FOREIGN PATENT DOCUMENTS

| | | |
|---|---|---|
| GB | 2522554 | 7/2015 |
| JP | 2003269023 | 9/2003 |
| JP | 2005315024 | 11/2005 |
| KR | 10-2012-007450 | 3/2012 |
| WO | 2015002090 | 1/2015 |

OTHER PUBLICATIONS

Extended European Search Report in European Application No. 16193004.5, dated Mar. 22, 2017, 7 pages (with English translation).

* cited by examiner

CONVENIENCE APPARATUS FOR VEHICLE AND VEHICLE

CROSS-REFERENCE TO RELATED APPLICATION

This application claims an earlier filing date and right of priority to Korean Patent Application No. 10-2015-0141719, filed on Oct. 8, 2015 in the Korean Intellectual Property Office, the contents of which is incorporated herein by reference in its entirety.

TECHNICAL FIELD

The present disclosure relates to a convenience apparatus for vehicles.

BACKGROUND

A vehicle is an apparatus that is moved in a desired direction by a user riding therein. A typical example of the vehicle is an automobile.

Vehicles have been increasingly equipped with various sensors and electronic devices to provide user convenience. In particular, various apparatuses for driver convenience are under development.

As various electronic devices are provided to vehicles, various convenience apparatuses or systems are also installed in vehicles.

SUMMARY

Systems and techniques are disclosed herein that enable a convenience apparatus for vehicles, the convenience apparatus configured to provide various convenience functions to a user based on at least one geo-fence that has been established around the vehicle.

In one aspect, a convenience apparatus for a vehicle includes a user sensing unit configured to sense a user located outside the vehicle; and an object sensing unit configured to sense an object other than the user located outside the vehicle. The convenience apparatus also includes a processor configured to determine at least one geo-fence established around the vehicle; and determine, based on the user sensing unit sensing the user outside the vehicle, whether an entrance event or an exit event of the user has occurred based on the at least one geo-fence around the vehicle. The processor is also configured to determine that the object sensing unit has sensed an object outside the vehicle; and based on the determination that the object sensing unit has sensed the object outside the vehicle and based on the determination that the entrance event or the exit event of the user has occurred, provide a signal that controls at least one operation of the vehicle according to the entrance event or the exit event of the user.

In some implementations, the at least one geo-fence includes a first geo-fence and a second geo-fence, and the processor is configured to determine whether the entrance event or the exit event of the user has occurred based on the at least one geo-fence around the vehicle by: determining that the entrance event of the user has occurred based on detecting that the user has crossed the first geo-fence; and determining that the exit event of the user has occurred based on detecting that the user has crossed the second geo-fence. The processor is also configured to provide the signal that controls the at least one operation of the vehicle according to the entrance event or the exit event of the user by providing a first signal that controls a first operation of the vehicle based on a determination that the entrance event of the user has occurred as a result of the user having crossed the first geo-fence; and providing a second signal that controls a second operation of the vehicle based on a determination that the exit event of the user has occurred as a result of the user having crossed the second geo-fence. In some implementations, the convenience apparatus further includes a user input unit configured to receive a user input. The processor is further configured to adjust a range or a shape of the geo-fence according to the user input received through the user input unit.

In some implementations, the processor is further configured to, based on the user input received through the user input unit, set a first function of the vehicle that is to be controlled based on detecting the entrance event of the user, and set a second function of the vehicle that is to be controlled based on detecting the exit event of the user.

In some implementations, the user input unit includes a touchscreen, and the processor is further configured to indicate, through the touchscreen and based on an accessory component being provided in the vehicle that performs a predetermined function whether the predetermined function of the accessory component is controllable according to a detection of the entrance event or the exit event of the user.

In some implementations, the user input unit includes a touchscreen, and the processor is further configured to adjust a range or a shape of the geo-fence according to a text input, a scroll input, a button input, or a touch-and-drag input received through the touchscreen.

In some implementations, the geo-fence includes a first geo-fence and a second geo-fence, and the processor is further configured to set, according to the received user input, the entrance event of the user to correspond to the first geo-fence, and set the exit event of the user to correspond to the second geo-fence.

In some implementations, the geo-fence includes a first geo-fence and a second geo-fence, and the processor is further configured to: display, on the touchscreen, a vehicle image corresponding to the vehicle; based on detecting an entrance event of the user for the first geo-fence, control a first geo-fence image corresponding to the first geo-fence to be displayed around the vehicle image; and based on detecting an exit event of the user for the second geo-fence, control a second geo-fence image corresponding to the second geo-fence to be displayed around the vehicle image.

In some implementations, the processor is further configured to control the first geo-fence image to be displayed in a first color and the second geo-fence image to be displayed in a second color.

In some implementations, the processor is further configured to: determine, through the user sensing unit, that the entrance event of the user has occurred in a state in which the vehicle is parked; and based on the determination that the entrance event of the user has occurred in the state in which the vehicle is parked, provide a signal that controls the vehicle to secure an exterior space around the vehicle that allows the user to enter the vehicle.

In some implementations, the processor is further configured to: determine, through the user sensing unit, that an entrance event of the user has occurred in a state in which the vehicle is vertically-parked; and based on the determination that the entrance event of the user has occurred in the state in which the vehicle is vertically-parked, provide a signal that controls an opening operation of a door of the vehicle.

In some implementations, the processor is further configured to: determine, through the object sensing unit, that an object is within a first distance from a driver's seat of the vehicle; and based on the determination that the object is within the first distance from the driver's seat of the vehicle, provide at least one signal that controls the vehicle to secure the exterior space around the vehicle by controlling the vehicle to move in a forward direction or a backward direction, and that controls an opening operation of a door of the vehicle after the vehicle has been moved in the forward direction or the backward direction.

In some implementations, the processor is further configured to: determine, through the user sensing unit, that the user is carrying luggage; and based on the determination that the user is carrying luggage, provide a signal that controls an opening operation of a trunk of the vehicle.

In some implementations, the processor is further configured to: determine, through the user sensing unit, that an entrance event of the user has occurred in a state in which the vehicle is parallel-parked; and based on the determination that the entrance event of the user has occurred in the state in which the vehicle is parallel-parked, provide a signal that controls a steering wheel of the vehicle to rotate in a direction corresponding to an expected driving direction.

In some implementations, the processor is further configured to: determine, through the user sensing unit, that an entrance event of the user has occurred in a state in which the vehicle is parked; and based on the determination that the entrance event of the user has occurred in a state in which the vehicle is parked, provide a signal that controls at least one of a lamp provided in the vehicle, a black box provided in the vehicle, a sunroof of the vehicle, or a window of the vehicle.

In some implementations, the convenience apparatus further includes an output unit. The user sensing unit includes: a camera module configured to sense the entrance event or the exit event of the user based on a captured image of the user; and a smart key communication module configured to sense the entrance event or the exit event of the user based on communication with a smart key carried by the user. The processor is further configured to: determine, based on the image of the user captured by the camera module, that the entrance event of the user has occurred; determine, through the smart key communication module, that a radio signal has not been received from a smart key carried by the user; and based on the determination that the entrance event of the user has occurred and that a radio signal has not been received from a smart key carried by the user, output an alarm signal through the output unit.

In some implementations, the processor is further configured to: determine, through the user sensing unit, that an exit event of the user has occurred in a state in which a parking operation of the vehicle has not yet completed; and based on the determination that the exit event of the user has occurred in the state in which the parking operation of the vehicle has not yet completed, provide a signal that controls the vehicle to complete the parking operation.

In some implementations, the processor is further configured to: determine, through the object sensing unit, that an object is located along a parking path of the parking operation of the vehicle; and based on the determination that an object is located along the parking path of the parking operation of the vehicle, provide a signal for performing a braking operation of the vehicle.

In another aspect, a vehicle includes a convenience apparatus that is configured according to one or more implementations described above.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1:
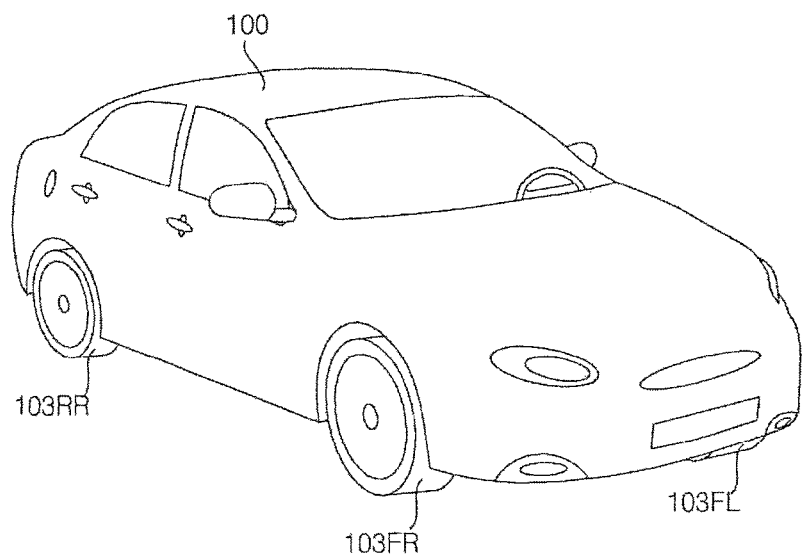
FIG. 1 is a diagram illustrating an example of an exterior of a vehicle.
Figure 1:
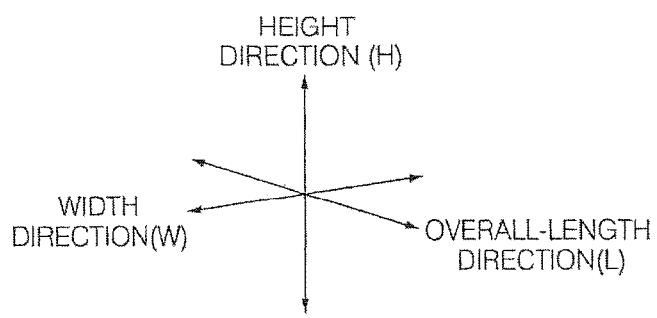

A convenience apparatus for a vehicle is described herein that provides various convenience functions to a user even if the user is outside of the vehicle. In some implementations, the convenience apparatus of the vehicle controls particular functions of the vehicle based on detecting a location and/or a movement of a user located outside the vehicle. In addition, the convenience apparatus of the vehicle detects objects, other than the user, around the vehicle to further adapt the control of the functions of the vehicle.

As such, the vehicle may provide various convenience functions even while a user is located outside the vehicle, and is not limited to providing convenience functions while the user is inside a vehicle, for example while the user is driving the vehicle or inside a parked vehicle.

For example, the convenience apparatus may track a user's position and/or movement outside the vehicle relative to one or more geo-fences around the vehicle. As such, the convenience apparatus may selectively control particular functions of the vehicle based on specific movements of the user, such as whether a user is within a particular region around the vehicle, or whether the user is moving into or out of a region.

The particular functions of the vehicle that are controlled may be adaptively set. The convenience apparatus may associate different functions of the vehicle with different types of movements of a user relative to different geo-fences around the vehicle. The vehicle may thereby provide adaptive and customized control of various functions of the vehicle based on different movements of the user outside the vehicle.

As an example, the convenience apparatus may control certain functions of a vehicle when a user is detected to have crossed a particular geo-fence, and control other functions of the vehicle as the user gets closer. As another example, the convenience apparatus may activate particular functions of the vehicle when the user is detected to have entered a particular region around the vehicle, and deactivate particular functions of the vehicle when user is detected to have exited a particular region around the vehicle. The particular regions around the vehicle may be established by geo-fences, which may be set, for example, by a user's input.

In addition to controlling particular functions of the vehicle based on detecting different movements of a user around the vehicle, the convenience apparatus may additionally detect objects around the vehicle and further adaptively control the functions of the vehicle. The detected objects may be objects in the road, or moving objects such as pedestrians or other vehicles, or objects related to a user such as an item carried by the user. As a specific example, the convenience apparatus may control a door of the vehicle to be automatically opened based on detecting that a user is carrying a large bag.

The detection of movements of a user and objects around the vehicle may be implemented using a variety of sensors and a variety of processing techniques based on the sensed data. For example, a distance between the vehicle and a user and/or an object may be determined using image processing, communication signal strength, or other techniques based on other types of sensors.

A vehicle as described in this disclosure may include a car or a motorcycle, but implementations are not necessarily limited thereto, and may generally include any suitable vehicle that transports people. Hereinafter the description will be based on a car.

The vehicle described in this disclosure may include a vehicle equipped with an internal combustion engine as a power source, a hybrid vehicle equipped with both an engine and an electric motor as a power source, an electric vehicle equipped with an electric motor as a power source, or generally a vehicle that is motorized by any suitable power source.

In the following description, the left side of a vehicle refers to the left side in a driving direction of the vehicle and the right side of the vehicle refers to the right side in the driving direction of the vehicle.

FIG. 1 shows the exterior of a vehicle according to an implementation.

Referring to FIG. 1, a vehicle 100 may include wheels 103FR, 103FL, 103RL, . . . rotated by a power source, and a steering wheel configured to control the wheels and adjust the travel direction of the vehicle 100.

The vehicle may include a convenience apparatus that provides various convenience functions to a user when the user is positioned outside the vehicle. The convenience apparatus may provide such functions, for example, when a user is within a particular region around the vehicle. In some implementations, a region around the vehicle may be defined by one or more geo-fences around the vehicle defined by the user. The convenience apparatus may provide various convenience functions to the user depending on the user's interactions with the geo-fences, for example, based on whether the user enters or leaves a geo-fence.

A geo-fence may be set up, for example, through user input. The types of convenience functions that are provided based on the user's interactions with a geo-fence may also be set through user inputs.

Figure 2:
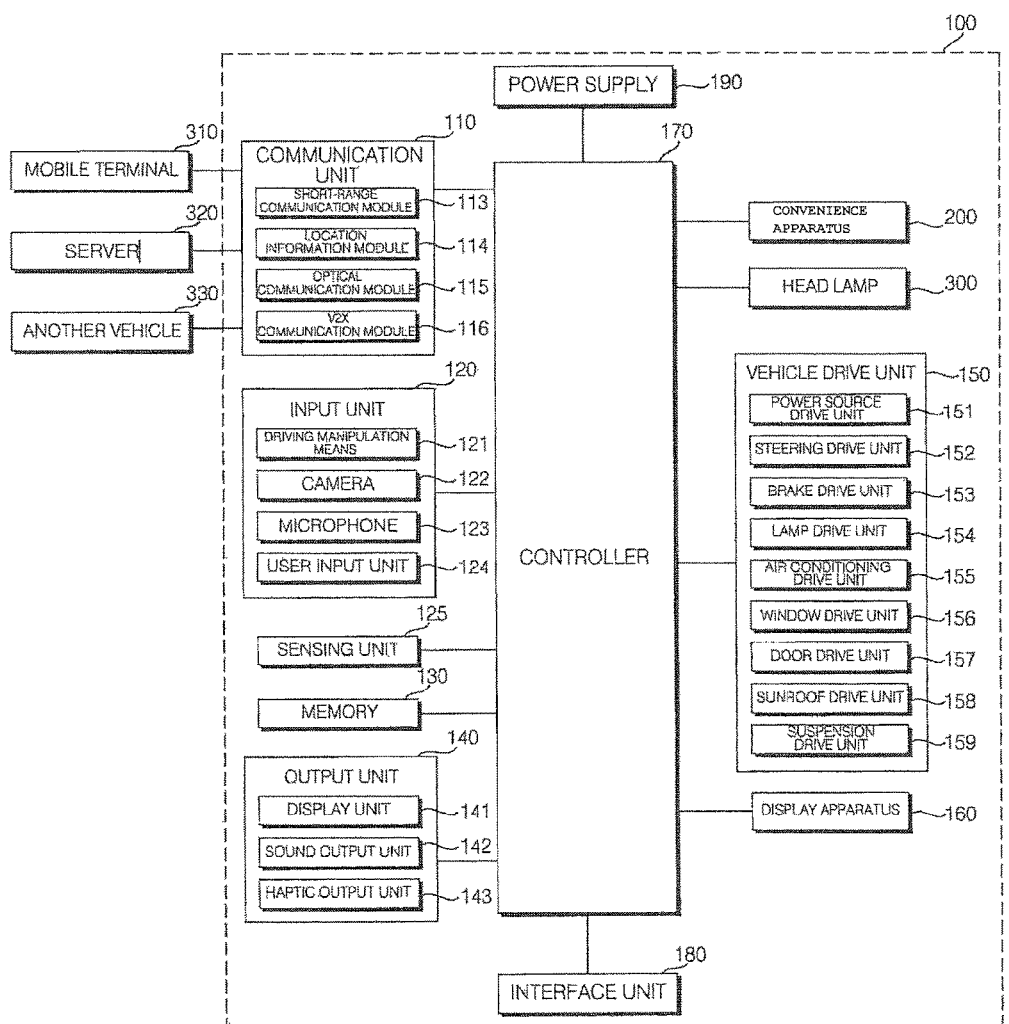
FIG. 2 is a block diagram illustrating an example of a vehicle.

FIG. 2 is a block diagram illustrating an example of components inside a vehicle according to an implementation.

Referring to the example of FIG. 2, the vehicle 100 may include a communication unit 110, an input unit 120, a sensing unit 125, a memory 130, an output unit 140, a vehicle drive unit 150, a controller 170, an interface unit 180, a power supply 190, a display apparatus 160, and a convenience apparatus 200.

The communication unit 110 may include, for example, a short-range communication module 113, a location information module 114, an optical communication module 115, and a V2X communication module 116. Implementations are not limited to these examples, however, and other suitable communication techniques may be used.

The short-range communication module 113, which is used for short-range communication, may support short-range communication using at least one of Bluetooth™, Radio Frequency Identification (RFID), Infrared Data Association (IrDA), ultra wideband (UWB), ZigBee, Near Field Communication (NFC), Wi-Fi, Wi-Fi Direct, Wireless Universal Serial Bus (Wireless USB) technologies, or other suitable short-range communication protocol.

The short-range communication module 113 may establish a wireless local area network to implement short-range communication between the vehicle 100 and at least one external device. For example, the short-range communication module 113 may wirelessly exchange data with the mobile terminal 310. The short-range communication module 113 may receive various types of information, such as weather information and traffic situation information (e.g., TPEG (Transport Protocol Expert Group)) from the mobile terminal 310. For example, once a user enters the vehicle 100, the mobile terminal 310 of the user may be paired with the vehicle 100 either automatically or by execution of an application by the user.

A typical example of the location information module 114, which serves to acquire the location of the vehicle 100, is a global positioning system (GPS) module. For example, if the vehicle utilizes the GPS module, the location of the vehicle may be acquired using a signal from a GPS satellite.

According to some implementations, the location information module 114 may be included in the sensing unit 125 rather than in the communication unit 110.

The optical communication module 115 may include a light transmitter and a light receiver.

The light receiver may covert a light signal into an electrical signal to receive information. The light receiver may include a photodiode (PD) for receiving light. The PD is configured to convert light into an electrical signal. For example, the light receiver may receive information regarding another vehicle by detecting light emitted from a light source in the other vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some implementations, the light transmitter may include an array of a plurality of light emitting devices. According to some implementations, the light transmitter may be integrated with a lamp provided to the vehicle 100. For example, the light transmitter may be at least one of a headlight, a taillight, a stop lamp, a turn signal lamp and a sidelight. For example, the optical communication module 115 may exchange data with another vehicle 330 through optical communication.

The V2X communication module 116 serves to perform wireless communication with a server 320 or another vehicle 330. The V2X communication module 116 includes a module capable of implementing a vehicle-to-vehicle communication (V2V) protocol or a vehicle-to-infrastructure communication (V2I) protocol. The vehicle 100 may perform wireless communication with the external server 320 or the vehicle 330 through the V2X communication module 116.

The input unit 120 may include a driving manipulation unit 121, a camera 122, a microphone 123 and user input unit 124.

The driving manipulation unit 121 receives user input for driving the vehicle 100. The driving manipulation unit 121 may include a steering input unit, a shift input unit, an acceleration input unit, and a brake input unit.

The steering input unit receives an input for the travel direction of the vehicle 100 from the user. Preferably, the steering input unit is formed in the shape of a wheel to allow steering input through rotation. According to some implementations, the steering input unit 121a may include a touchscreen, a touch pad, or a button.

The shift input unit receives, from the user, inputs for Park (P), Drive (D), Neutral (N) and Reverse (R) of the vehicle 100. Preferably, the shift input unit is formed in the shape of a lever. According to some implementations, the shift input unit may include a touchscreen, a touch pad, or a button.

The acceleration input unit receives an input for accelerating the vehicle 100 from the user. The brake input unit receives an input for decelerating the vehicle 100 from the user. Preferably, the acceleration input unit and the brake input unit are formed in the shape of a pedal. According to some implementations, the acceleration input unit or the brake input unit may include a touchscreen, a touch pad, or a button.

The camera 122 may include an image sensor and an image processing module. The camera 122 may process a still image or a moving image obtained by the image sensor (e.g., CMOS or CCD). The image processing module may extract necessary information by processing the still image or moving image obtained through the image sensor, and transfer the extracted information to the controller 170.

Meanwhile, the vehicle 100 may include a front camera 122a for capturing a vehicle front view image, and an around-view camera 122b configured to capture an image of surroundings of the vehicle, and an interior camera 122c. Each of the cameras 122a, 122b and 122c may include a lens, and an image sensor and a processor. The processor may generate data or information by computer-processing captured images and deliver the generated data or information to the controller 170.

The processor included in the camera 122 may be controlled by the controller 170.

The processor included in the camera 122 may be implemented by hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

In some implementations, the front camera 122a may include a stereo camera. In this case, the processor of the camera 122a a distance to an object, a relative speed of an object detected in a stereo image and distances but when a plurality of objects using a disparity detected in the stereo image.

The around-view camera 122b may include a plurality of cameras. For example, the cameras may be disposed on the left side, rear side, right side and front side of the vehicle.

The left camera may be disposed in a case surrounding the left side-view mirror. Alternatively, the left camera may be disposed at the exterior of the case surrounding the left side-view mirror. Alternatively, the left camera may be disposed in one outer area of the left front door, left rear door or left fender.

The right camera may be disposed in a case surrounding the right side-view mirror. Alternatively, the right camera may be disposed at the exterior of the case surrounding the right side-view mirror. Alternatively, the right camera may be disposed at one outer area of the right front door, right rear door or right fender.

The rear camera may be disposed near the rear license plate, trunk switch or tailgate switch.

The front camera may be disposed near the emblem or radiator grille.

Images captured by the plurality of cameras may be delivered to the processor of the camera 122b, and the processor may synthesize the images to create a surroundings-of-vehicle image. In this case, the surroundings-of-vehicle image may be displayed through a display unit 141 as a top view image or bird's eye view image.

The interior camera 122c may capture images of the interior of the vehicle 100. The interior camera 122c may acquire an image of persons in the vehicle.

By acquiring the image of the people in the vehicle 100, the processor of the interior camera 122c may detect the number of the persons and seats by the persons are positioned. For example, the interior camera 122c may detect presence of a passenger and the position of the passenger.

The interior camera 122c may acquire an image for biometric recognition of the persons in the vehicle. The processor of the interior camera 122c may check IDs of the persons in the vehicle based on the face images of the persons.

According to an implementation, the processor of the interior camera 122c may detect the type of a person in the vehicle based on the image of the person. For example, the processor of the interior camera 122c may detect, through a predetermined image processing algorithm, whether the driver is an elder, a disabled person or a pregnant woman.

The microphone 123 may process an external sound signal to create electrical data. The data created through processing may be utilized for various purposes according to functions being executed by the vehicle 100. The microphone 123 may convert a voice command from the user into electrical data. The electrical data may be delivered to the controller 170.

According to an implementation, the camera 122 or microphone 123 may be a constituent included in the sensing unit 125 rather than in the input unit 120.

The user input unit 124 is intended to receive information input by the user. When information is input through the user input unit 124, the controller 170 may control operation of the vehicle 100 in accordance with the input information. The user input unit 124 may include a touch input unit or a mechanical input unit. According to some implementations, the user input unit 124 may be disposed in one area of the steering wheel. In this case, the driver may manipulate the user input unit 124 with fingers while holding the steering wheel.

The sensing unit 125 senses various situations of the vehicle 100. To this end, the sensing unit 125 may include a collision sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, a vehicle interior temperature sensor, a vehicle interior humidity sensor, an ultrasonic sensor, radar, and lidar (Light Detection And Ranging).

Thereby, the sensing unit 125 may acquire sensing signals that include various types of information, such as vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, an angle by which the steering wheel is rotated, and illumination.

The sensing unit 125 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The location information module 114 may be classified as a constituent of the sensing unit 125. The camera 122 may be classified as a constituent of the sensing unit 125.

The memory 130 is electrically connected to the controller 170. The memory 130 may store basic data for each unit, control data for controlling operation of each unit, and input/output data. When implemented through hardware, the memory 130 may include various storage devices such as a ROM, RAM, EPROM, flash drive, and hard drive. The memory 130 may store various kinds of data for overall operation of the vehicle 100 including a program for processing or controlling operation of the controller 170.

The output unit 140, which serves to output information processed by the controller 170, may include a display unit 141, a sound output unit 142 and a haptic output unit 143.

The display unit 141 may display information processed by the controller 170. For example, the display unit 141 may display vehicle-related information. Herein, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 141 may include at least one of a liquid crystal display (LCD), a thin film transistor-liquid crystal display (TFT LCD), an organic light-emitting diode (OLED) display, a flexible display, a 3D display and an e-ink display.

The display unit 141 may form a layered architecture together with a touch sensor or be integrated with the touch sensor, thereby implementing a touchscreen. Such touchscreen may function as the user input unit 124 providing an input interface between the vehicle 100 and the user and also as an output interface between the vehicle 100 and the user. In this case, the display unit 141 may include a touch sensor for sensing touch applied to the display unit 141 in order to receive a control command in a touch manner. Thereby, when the display unit 141 is touched, the touch sensor may sense the touch, and the controller 170 may generate a control command corresponding to the touch. Content input through touch may include characters, numbers, or menu items which can be indicated or specified in various modes.

In some implementations, the display unit 141 may include a display cluster to allow the driver to check the vehicle condition information or vehicle driving information during driving. The cluster may be positioned on the dashboard. In this case, the driver can check the information displayed on the cluster while looking forward.

The sound output unit 142 converts an electrical signal from the controller 170 into an audio signal and outputs the audio signal. To this end, the sound output unit 142 may be provided with a speaker. The sound output unit 142 may output sound corresponding to operation of the user input unit 124.

The haptic output unit 143 generates haptic output. For example, the haptic output unit 143 may vibrate the steering wheel, a seat belt and a seat to allow the user to recognize the output.

The vehicle drive unit 150 may control operation of various vehicular devices. The vehicle drive unit 150 may include a power source drive unit 151, a steering drive unit 152, a brake drive unit 153, a lamp drive unit 154, an air conditioning drive unit 155, a window drive unit 156, a door drive unit 157, a sunroof drive unit 158 and a suspension drive unit 159.

The power source drive unit 151 may perform electronic control of the power source in the vehicle 100.

For example, if a fossil fuel-based engine is the power source, the power source drive unit 151 may perform electronic control of the engine. Thereby, the output torque of the engine may be controlled. If the power source drive unit 151 is an engine, the output torque of the engine may be controlled by the controller 170 to limit the speed of the vehicle.

As another example, if an electric motor is the power source, the power source drive unit 151 may control the motor. Thereby, the rotational speed and torque of the motor may be controlled.

The steering drive unit 152 may perform electronic control of the steering apparatus in the vehicle 100. Thereby, the steering drive unit 152 may change the travel direction of the vehicle.

The brake drive unit 153 may perform electronic control of a brake apparatus in the vehicle 100. For example, by controlling the operation of the brakes disposed on the wheels, the speed of the vehicle 100 may be reduced. In another example, the brake disposed on a left wheel may be operated differently from the brake disposed on a right wheel in order to adjust the travel direction of the vehicle 100 to the left or right.

The lamp drive unit 154 may control lamps disposed inside and outside the vehicle to be turned on/off. In addition, the lamp drive unit 154 may control the intensity and direction of light from the lamps. For example, the lamp drive unit 154 may control a turn signal lamp and a brake lamp.

The air conditioning drive unit 155 may perform electronic control of an air conditioner in the vehicle 100. For example, if the temperature of the interior of the vehicle is high, the air conditioning drive unit 155 may control the air conditioner to supply cool air to the interior of the vehicle.

The window drive unit 156 may perform electronic control of a window apparatus in the vehicle 100. For example, the window drive unit 156 may control opening or closing of the left and right windows on both sides of the vehicle.

The door drive unit 157 may perform electronic control of door of the vehicle 100. For example, the door drive unit 157 may control a door to open based on information detected by the sensing unit 125, or based on an input received by the input unit 120, or based on an operation performed by the convenience apparatus 200.

The sunroof drive unit 158 may perform electronic control of a sunroof apparatus in the vehicle 100. For example, the sunroof drive unit 158 may control opening or closing of the sunroof.

The suspension drive unit 159 may perform electronic control of a suspension apparatus in the vehicle 100. For example, when a road surface is uneven, the suspension drive unit 159 may control the suspension apparatus to attenuate vibration of the vehicle 100.

The controller 170 may control overall operations of the various units in the vehicle 100. In some implementations, the controller 170 may be referred to as an electronic control unit (ECU).

The controller 170 may receive object information from the convenience apparatus 200 for vehicles. In some implementations of the present disclosure, the object information may include presence or absence of an object and the position, distance, and relative speed of the object with respect to the vehicle.

The controller 170 may control various apparatuses of the vehicle 100 through the vehicle drive unit 150 based on the received object information.

For example, the controller 170 control the steering apparatus through the steering drive unit 152 based on the object information.

As another example, the controller 170 may control the suspension apparatus through the suspension drive unit 159 based on the object information.

As another example, the controller 170 may control the brake apparatus through the brake drive unit 153 based on the object information.

The controller 170 may be implemented in hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The interface unit 180 may serve as an interface to various kinds of external devices connected to the vehicle 100. For example, the interface unit 180 may be provided with a port connectable to the mobile terminal 310, thus being connected to the mobile terminal 310 through the port. In this case, the interface unit 180 may exchange data with the mobile terminal 310.

The interface unit 180 may also serve as an interface through which electrical energy is supplied to the mobile terminal 310 connected thereto. If the mobile terminal 310 is electrically connected to the interface unit 180, the interface unit 180 is controlled by the controller 170 to provide the mobile terminal 310 with electrical energy supplied from the power supply 190.

The power supply 190 may be controlled by the controller 170 to supply electric power necessary for operation of respective constituents. In particular, the power supply 190 may receive power from, for example, a battery in the vehicle.

The display apparatus 160 may output various kinds of information or content. The display apparatus 160 may be integrated with the display unit 141 and the sound output unit 142 described above.

The display apparatus 160 may display the screen based on the information or data received from the convenience apparatus 200.

According to an implementation, the display apparatus 160 may be implemented as a head up display (HUD). In this case, the display apparatus 160 may be provided with a projection module, thereby outputting information through an image projected onto the windshield or side window glass.

According to an implementation, the display apparatus 160 may include a transparent display. In this case, the transparent display may be attached to the windshield or side window glass. In this case, the display apparatus 160 may output information through the transponder display provided to the windshield.

The transparent display may have predetermined transparency and display a predetermined screen. To obtain transparency, the transparent display may include at least one of a transparent thin film electroluminescent (TFEL) display, a transparent organic light-emitting diode (OLED) display, a transparent liquid crystal display (LCD), a transmissive transparent display, and a transparent light emitting diode (LED) display. Transparency of the transparent display may be adjusted.

Hereinafter, the convenience apparatus 200 will be described in detail with reference to FIGS. 3A to 18.

Figure 3A:
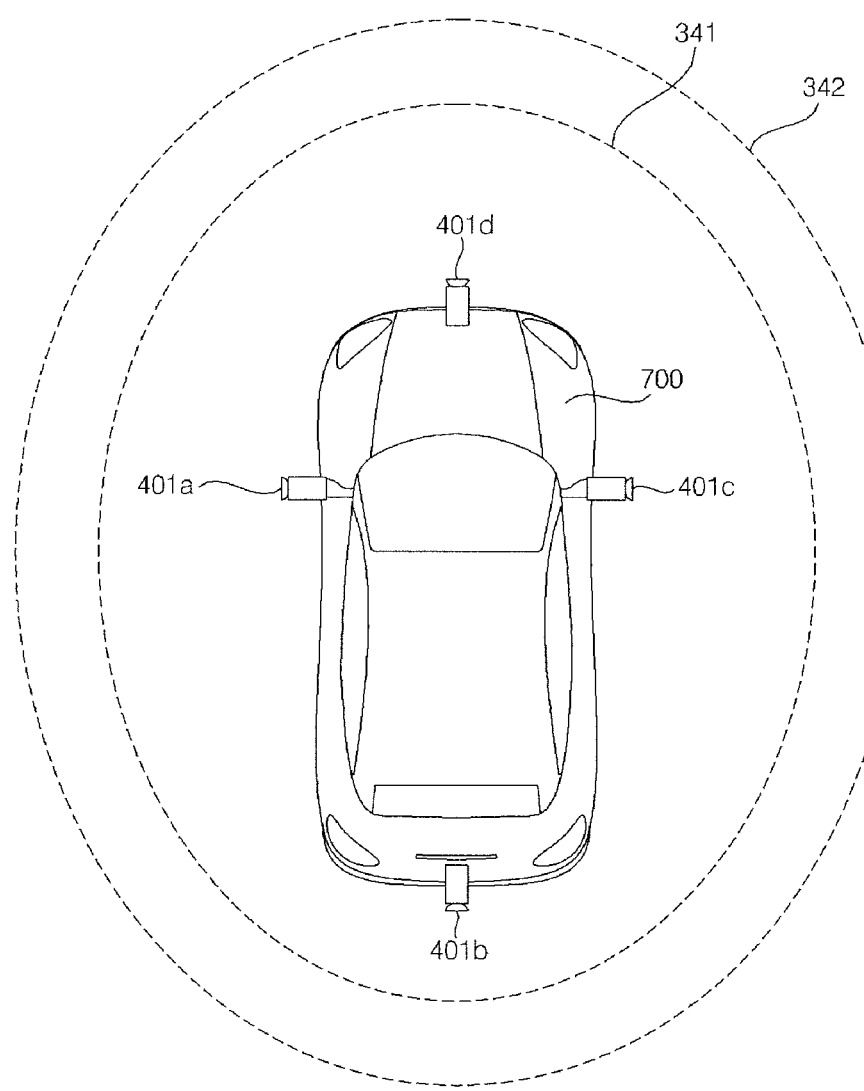
FIG. 3A is a diagram illustrating an example of a camera module and a geo-fence.

FIG. 3A is a view illustrating a camera module and a geo-fence according to an implementation.

Referring to FIG. 3A, the convenience apparatus 200 for a vehicle may establish one or more geo-fences, such as a geo-fence 341 and a geo-fence 342. The geo-fences may represent any appropriate geographical region. In the example of FIG. 3A, the geo-fences 341 and 342 may be a virtual perimeter for a real-world geographic area.

The geo-fences 341 and 342 may be established to be within a sensing range of a sensing module or within a communication range of a communication module, so that persons or objects within the geo-fences may be detected by the sensing module or communicated with by the communication module.

In some implementations, a plurality of geo-fences may be provided. Although FIG. 3 shows two geo-fences 341 and 342, in general any suitable number of geo-fences may be utilized.

The geo-fences 341 and 342 may have various shapes. While the geo-fences 341 and 342 in FIG. 3A are illustrated as having a circular shape, implementations of the present disclosure are not limited to a particular shape of geo-fence.

The geo-fences may have various shapes such as an ellipse or a polygon, such as a triangle, a rectangle, a pentagon, or a hexagon.

The vehicle include one or more camera modules, such as cameras 401a, 401b, 401c and 401d. Although FIG. 3A illustrates four cameras in this implementation, any suitable number of cameras may be utilized in the vehicle.

The cameras 401a, 401b, 401c and 401d may be disposed at any suitable position on the vehicle to detect a user's interactions with geo-fences that have been established around the vehicle. In some implementations, the cameras 401a, 401b, 401c and 401d may be distributed around the vehicle, such as at the left, back, right and front of the vehicle, respectively, as shown in the example of FIG. 3A.

As a specific example, the left camera 401a and the right camera 401c may be disposed in a housing or case surrounding the left side-view mirror and a case surrounding the right side-view mirror, respectively.

The rear camera 401b and the front camera 401d may be disposed, for example, near the trunk switch and on or near the front emblem of the vehicle, respectively.

In some implementations, the image captured by the cameras 401a, 401b, 401c and 401d may be delivered to a controller of the vehicle, such as the controller 170 in FIG. 2. The controller may, for example, combine the images from different cameras to create an around-view image of the surroundings of the vehicle.

Figure 3B:
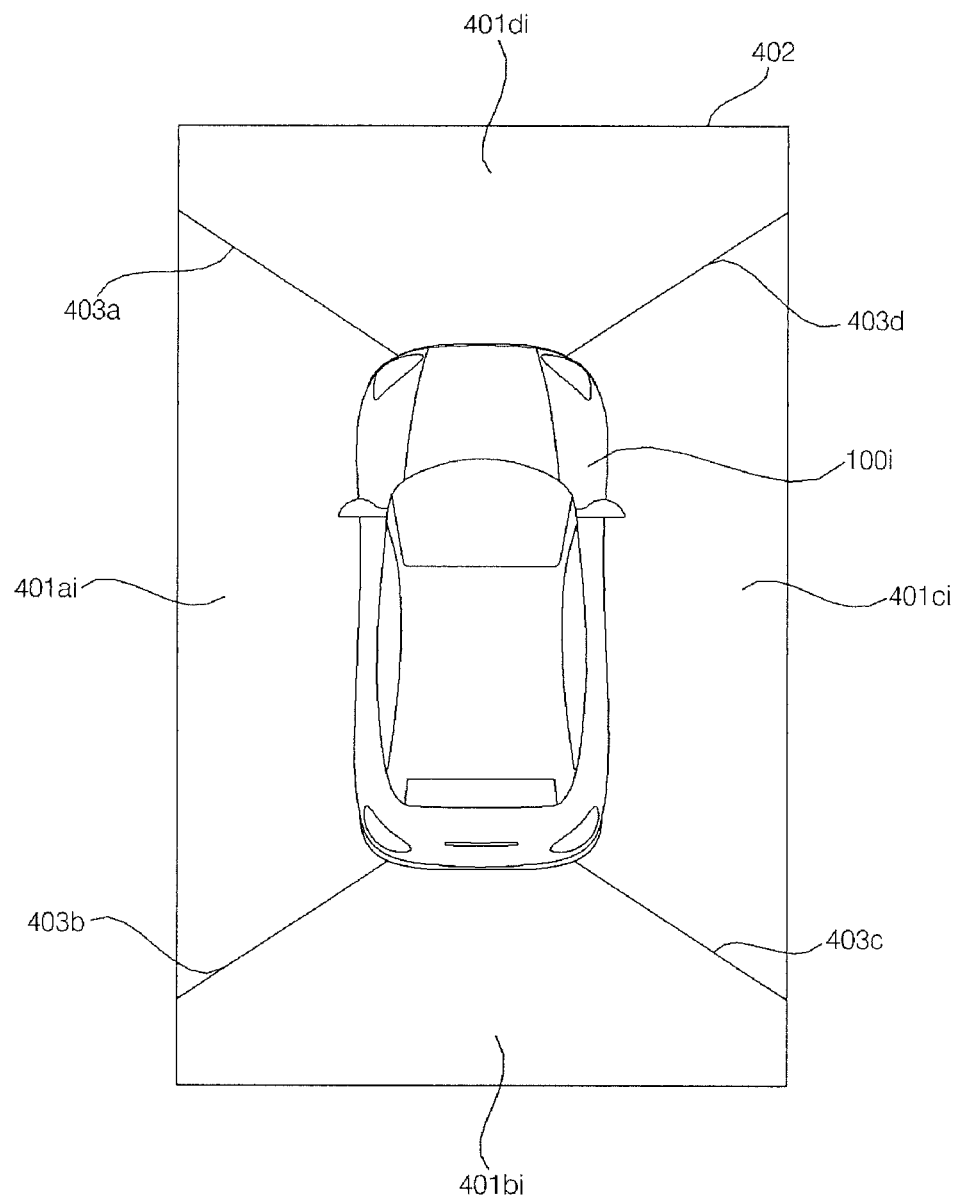
FIG. 3B is a diagram illustrating an example of an around-view image.

FIG. 3B is a view illustrating an example of an around-view image according to an implementation.

The around-view image 402 may include a first image area 401ai from the left camera 401a, a second image area 401bi from the rear camera 401b, a third image area 401ci from the right camera 401c, and a fourth image area 401di from the front camera 401d.

In some implementations, an around-view image may be created by combining a plurality of images captured by different cameras, and additionally boundary parts may be produced among the respective image areas. The boundary parts may have any suitable appearance indicating boundaries around the respective image areas. As an example, the boundary parts may be processed through image blending to look natural when they are displayed.

In some implementations, boundary lines 403a, 403b, 403c, and 403d may be displayed on the respective boundaries between the images captured by different cameras.

The camera module 221, 231 may be referred to as an around view monitoring (AVM) apparatus.

Figure 4:
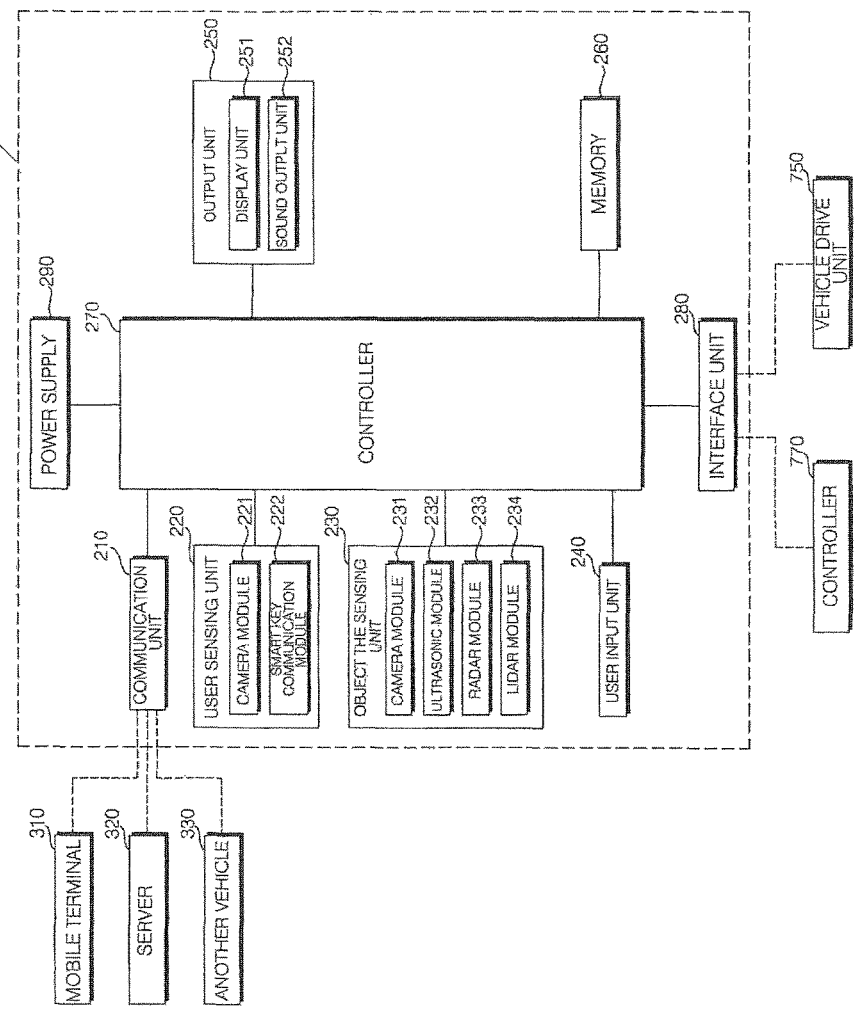
FIG. 4 is a block diagram illustrating an example of a convenience apparatus for vehicles.

FIG. 4 is a block diagram illustrating an example of a convenience apparatus for vehicles according to an implementation.

Referring to FIG. 4, the convenience apparatus 200 may include a communication unit 210, a user sensing unit 220, an object sensing unit 230, user input unit 240, an output unit 250, a memory 260, a processor 270, an interface unit 280, and a power supply 290.

The communication unit 210 may wirelessly exchange data with a mobile terminal 310, a server 320 or another vehicle 330. In particular, the communication unit 210 may wirelessly exchange data with a mobile terminal of a user or the driver of the vehicle. The communication unit 210 may use any suitable wireless data communication schemes, such as Bluetooth, Wi-Fi Direct, Wi-Fi, APiX, or NFC, as examples.

The communication unit 210 may receive various types of information, such as weather information and/or traffic situation information (e.g., TPEG (Transport Protocol Expert Group)) from the mobile terminal 310 or the server 320. The vehicle 100 may transmit recognized real-time information to the mobile terminal 310 or the server 320.

When a user enters the vehicle, the mobile terminal 310 of the user may be paired with the vehicle 100 automatically or by execution of an application by the user.

As a specific example, the communication unit 210 may receive change-of-traffic light information from the external server 320. In some implementations, the external server 320 may be a server positioned at a traffic control center that controls traffic.

The user sensing unit 220 may sense movements of the user relative to the one or more geo-fences that have been established around the vehicle. For example, the user sensing unit 220 may sense an entrance and exit of the user with respect to a geo-fence established around the vehicle.

In some implementations, the user sensing unit 220 may include a sensing module or communication module, and a geo-fence may be established within the sensing range of the sensing module or within a communication range of the communication module included in the user sensing unit 220.

For example, when the distance limit of the camera module 221 for sensing the user is 20 meters, a geo-fence may be established within a radius of 20 meters from the vehicle.

As another example, when the distance limit for communication between a smart key communication module 222 and a smart key carried by the user is 20 meters, the geo-fence may be established within a radius of 20 meters from the vehicle.

Various properties of a geo-fence may be set as a default when the vehicle is manufactured or may be adaptively set by user's input.

In some implementations, the user sensing unit 220 may include a camera module 221 and/or a smart key communication module 222. Using at least one of the camera module 221 or a smart key communication module 222, the user sensing unit 220 may detect a distance of the user to the vehicle, and use the detected distance to track a user's interactions with one or more geo-fences.

For example, in some implementations, the user sensing unit 220 may use the camera module 221 to sense an entrance or exit of the user with respect to a geo-fence based on an image acquired by the camera 401. Herein, the image may be an image captured by the user.

Figure 5:
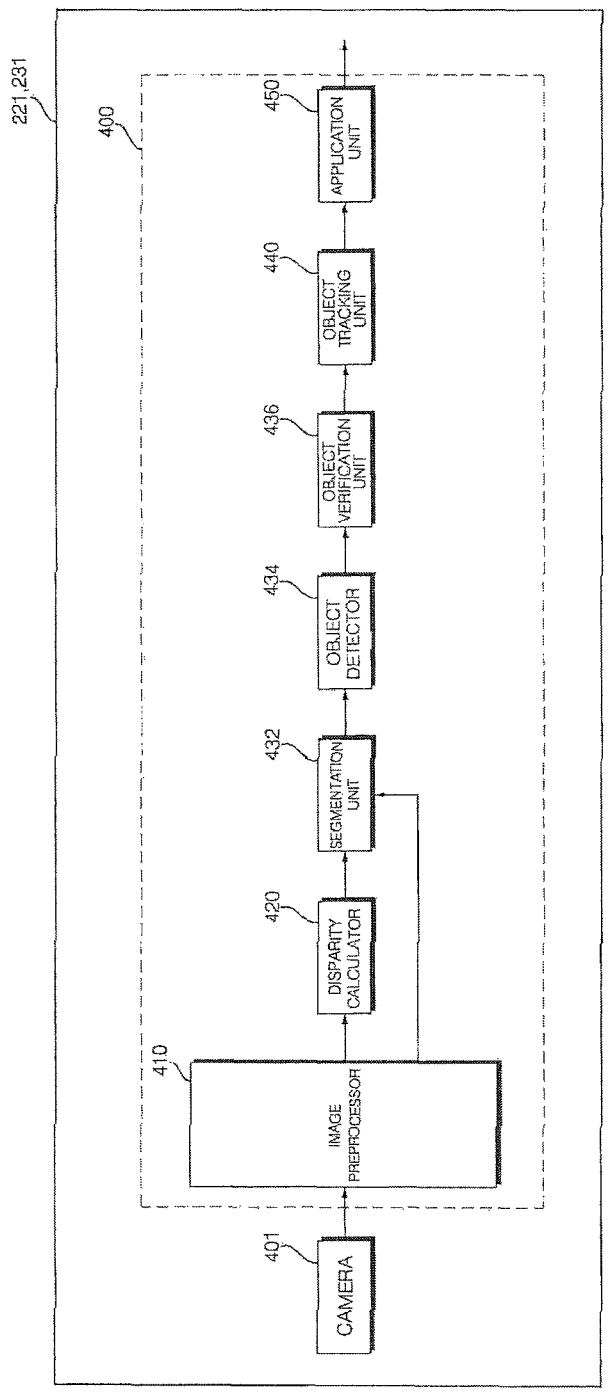
FIGS. 5 and 6 are block diagrams illustrating examples of a camera module.
Figure 6:
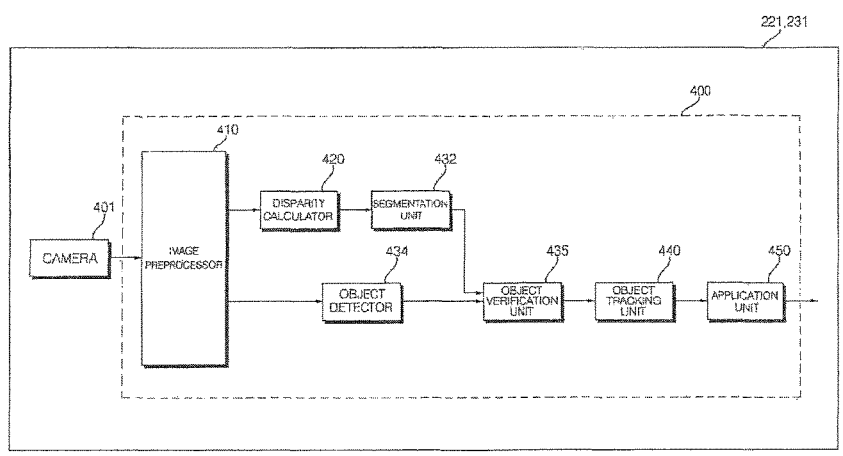

The camera module 221 may include a camera (e.g., camera 401 in FIGS. 5 and 6) and a camera processor (e.g., camera processor 400 in FIGS. 5 and 6).

In some implementations, the camera 401 may include a plurality of cameras, as shown in the examples of FIGS. 3A and 3B.

The camera processor 400 may detect the user by processing an image acquired by the camera 401. The camera processor 400 may to detect the user in the image by comparing the acquired image with stored data, for example data stored in the memory 260. The comparison may be done using any suitable technique. For example, in some implementations, the camera processor 400 may detect the user by performing a matching operation using feature points of the face of the user.

The camera processor 400 may detect a distance to an object. The distance may be detected based on analyzing a variation of an appearance of the object in a plurality of acquired frames. For example, the camera processor 400 may detect the distance to the object based on changes in a size of the object in the plurality of acquired frames.

The camera processor 400 may monitor the distance between the vehicle 100 and the detected user, and track the user's interactions with a geo-fence based on changes in the distance. The camera processor 400 may, for example, sense whether the user enters or leaves the geo-fence based on changes in the distance between the vehicle 100 and the user relative to the geo-fence.

The camera module 221 may transmit, for example to the processor 270, information that has been sensed about an entrance or exit of the user into or from the geo-fence.

In some implementations, the user sensing unit 220 may use the smart key communication module 222 to determine a distance between the vehicle and a user. For example, the smart key communication module 222 may sense the user based on communication with a smart key that is carried by the user. In such implementations, the smart key communication module 222 may include a transmission/reception antenna, a memory, a processor, and a power supply.

The smart key communication module 222 may perform wireless communication with the smart key carried by the user. For example, the smart key communication module 222 may perform low-frequency (LF) wireless communication with the smart key carried by the user.

The smart key communication module 222 may sense the distance between the vehicle 100 and the user based on the strength of a signal received from the smart key. For example, the smart key communication module 222 may sense the distance between the vehicle 100 and the user based on a received signal strength indication (RSSI).

The smart key communication module 222 may monitor the distance between the vehicle 100 and the detected user based on the strength of the signal, and track the user's interactions with a geo-fence based on changes in the distance. The smart key communication module 222 may sense whether the user enters or leaves the geo-fence based on change in the distance between the vehicle 100 and the user.

The smart key communication module 222 may transmit, for example to the processor 270, user sensing information indicating the user's entrance into or exit from the geo-fence.

In addition to the user sensing unit 220 detecting a user near the vehicle 100, the object sensing unit 230 may sense an object positioned near the vehicle 100. Herein, the object may be an object other than the user. For example, the object may include a pedestrian, a two-wheeled vehicle, another vehicle, a structure, or any other suitable object positioned near the vehicle 100. As further examples, the object may be an object fixed to the ground, such as a wall, a street tree, a traffic light, and a pole, or may be a moving object, such as another vehicle or pedestrian.

In some implementations, the object sensing unit 230 may include a camera module 231, an ultrasonic module 232, a radar module 233, and a lidar module 234. Using at least one of these modules, the object sensing unit 230 may detect a distance between an object and the vehicle.

In some implementations, the camera module 231 may detect an object based on an image acquired by the camera 401.

The camera module 231 may include the camera 401 and the camera processor 400, as shown in the examples of FIGS. 5 and 6.

In some implementations, the camera 401 may include a plurality of cameras as illustrated in the examples of FIGS. 3A and 3B.

The camera processor 400 may detect an object by processing an image acquired by the camera 401. The camera processor 400 may detect the object by comparing the image with stored data, for example, data stored in the memory 260.

The camera processor 400 may detect a distance to an object based on variation of the object in a plurality of acquired frames. For example, the camera processor 400 may detect the distance to the object based on change in size of the object in the acquired frames.

As an example, if a stationary object is detected while parking the vehicle 100, the distance to the stationary object may be detected based on variations of an appearance of the object in a plurality of frames according to movements of the vehicle 100 during the parking operation.

In some implementations, the camera module 231 may transmit the acquired object information to the processor 270. For example, the object information may include distance-to-object information.

The ultrasonic module 232 may include, as examples, an ultrasound transmitter, an ultrasound receiver, and a processor. The ultrasonic module 232 may detect an object based on transmitted ultrasound and, based on the detection of the object, detect a distance and a relative speed of the detected object.

The ultrasonic module 232 may transmit the acquired object information to the processor 270. In some implementations, the object information may include distance-to-object information.

The radar module 233 may include, for example, an electromagnetic wave transmitter, an electromagnetic wave receiver, and a processor. In some implementations, the radar module 233 may be implemented using a pulse radar technique or a continuous wave radar technique based on the electromagnetic wave radiation principle. As examples, the radar module 233 employing the continuous wave radar technique may utilize a frequency-modulated-continuous-wave (FMCW) scheme or a frequency-shift-keying (FSK) scheme according to a signal waveform.

The radar module 233 may detect an object based on a transmitted electromagnetic wave and, based on the detection of the object, detect the distance and the relative speed of the object.

The radar module 233 may transmit the acquired object information to the processor 270. For example, the object information may include distance-to-object information.

The lidar module 234 may include, as examples, a laser transmitter, a laser receiver, and a processor. The lidar module 234 may utilize a Time of Flight (TOF) technique or a phase-shift technique, as examples.

In scenarios where the lidar module 234 utilizes the TOF technique, the lidar module 234 emits a laser pulse signal and receives a reflected pulse signal reflected by an object. The lidar module 234 may measure the distance to the object based on the time at which the laser pulse signal is emitted and the time at which the reflected pulses signal is received. In addition, the lidar module 234 may measure the relative speed of the object based on changes of the measured distance over time.

In scenarios where the lidar module 234 utilizes the phase-shift technique, the lidar module 234 may emit a laser beam that is modulated (e.g., continuously) at a specific frequency, and measure a time and a distance to the object based on measuring the amount of phase shift of the return signal reflected by the object. In addition, the lidar module 234 may measure the relative speed of the object based on changes of the measured distance over time.

The lidar module 234 may detect the object based on the transmitted laser and, based on his detected object, then detect the distance and relative speed of the detected object.

The lidar module 234 may transmit the acquired object information to the processor 270. For example, the object information may include distance-to-object information.

The user input unit 240 may include one or more components that enable a user to enter information, such as a button or a touchscreen. In some implementations, the convenience apparatus 200 may be turned on and operated through use of the user input unit 240. In addition, the user input unit 240 may enable a user to input various settings for the convenience apparatus 200.

The output unit 250 may output various types of signals, data, or information. The output unit 250 may operate as an output interface for the user. The output unit 250 may include a display unit 251 and a sound output unit 252.

The display unit 251 may display various types of data or information processed by the processor 270.

The display unit 251 may also provide various types of user interfaces, and may be provided with a touch sensor enabling touch-based inputs to the provided user interfaces.

The display unit 251 may include at least one of a liquid crystal display (LCD), a thin film transistor-liquid crystal display (TFT LCD), an organic light-emitting diode (OLED) display, a flexible display, a 3D display, and/or an e-ink display.

The display unit 251 may form a layered structure together with a touch sensor or may be integrated with the touch sensor to implement a touchscreen. The touchscreen may operate as the user input unit 240 providing an input interface between the convenience apparatus 200 and the user, and may also provide an output interface between the convenience apparatus 200 and the user. In this case, the display unit 251 may include a touch sensor configured to sense a touch-based input on the display unit 251 so as to receive a control command in a touch-based manner. Thereby, when the display unit 251 is touched, the touch sensor may sense the touch-input, and the processor 270 may generate, based on the sensed touch-input, a control command corresponding to the touch. Content that is input in a touch-based manner may include, for example, characters, numbers, instructions in various modes, menu items which can be designated, or any other suitable type of input.

In some implementations, the display unit 251 may be configured to display a screen window in one area of the windshield.

The display unit 251 may include a transparent display. In this case, the transparent display may be attached to the windshield or side window glass. In this case, the convenience apparatus 200 may output information through the transparent display.

In some implementations, the transparent display may have a predetermined transparency and may display a pre-determined screen window. To implement transparency, the transparent display may include at least one of a transparent thin film electroluminescent (TFEL) display, a transparent organic light-emitting diode (OLED) display, a transparent liquid crystal display (LCD), a transmissive transparent display, or a transparent light emitting diode (LED) display.

Transparency of the transparent display may be adjusted according to control of the processor 270.

In some implementations, the display unit 251 may include a projection module configured to project information on a suitable portion of the vehicle. For example, the convenience apparatus 200 may output information through an image projected onto the windshield or the side window glass.

In some implementations, the projection module projects a beam onto the windshield of the vehicle. The projection module may include a light source and a projection lens. The position module may implement an image corresponding to the information processed by the processor 270. Specifically, the projection module may implement an image using light generated from the light source, and project the implemented image onto the windshield. Herein, an LED or laser may be used as the light source.

In some implementations, the display unit 251 may be integrated with the display apparatus 160 described above.

The sound output unit 252 may output sound, for example, based on an audio signal processed by the processor 270. To this end, the sound output unit 252 may include at least one speaker.

The memory 260 may store various kinds of data for overall operation of the convenience apparatus 200 including, but not limited to, the processing or control operation of the processor 270.

In some implementations, the memory 260 may store data that is used to identify the user. For example, when an object is detected in an image acquired through the camera module 221, the memory 260 may store data that is used to verify, according to a predetermined algorithm, whether the object corresponds to the user.

The memory 260 may store data that is used for authenticating the user. For example, the memory 260 may store biometric information about the user for face recognition, fingerprint recognition, voice recognition, and the like.

The memory 260 may store data that is for identifying an object. For example, when a predetermined object is detected in an image acquired through the camera module 231, the memory 260 may store data that is used for identifying, according to a predetermined algorithm, the object.

In some implementations, the memory 260 may be implemented by hardware, and may include various storage devices such as a ROM, RAM, EPROM, flash drive, and hard drive.

The processor 270 may, in some implementations, control overall operations of each unit in the convenience apparatus 200.

The processor 270 may provide a signal for controlling at least one of the functions of the vehicle 100 in response to an object sensed through the object sensing unit 230 and an entrance or exit of the user sensed through the user sensing unit 220.

For example, the processor 270 may receive object information from the object sensing unit 230. The processor 270 may receive, from the user sensing unit 220, sensing information about an entrance or an exit of the user into or from a geo-fence.

The processor 270 may provide, based on the object information and the sensing information about entrance or exit of the user, various types of signals that control one or more functions of the vehicle 100. Such signals that control one or more functions of the vehicle 100 may be provided, for example, to the vehicle drive unit 150.

As an example of such signals, the processor 270 may provide the power source drive unit 151 with a signal for driving the power source of the vehicle.

As another example, the processor 270 may also provide the steering drive unit 152 with a signal for steering control.

As another example, the processor 270 may provide a brake drive unit 153 with a signal for brake control.

As another example, the processor 270 may provide the lamp drive unit 154 with a signal for lamp control.

As another example, the processor 270 may provide the air conditioning drive unit 155 with a signal for controlling air conditioning.

As another example, the processor 270 may provide the window drive unit 156 with a signal for window control.

As another example, the processor 270 may provide the door drive unit 157 with a signal for door control.

As another example, the processor 270 may provide the sunroof drive unit 158 with a signal for sunroof control.

As another example, the processor 270 may provide the suspension drive unit 159 with a signal for suspension control.

As another example, the processor 270 may provide an engine start drive unit with a signal for turning the engine on/off.

As another example, the processor 270 may provide a side-view mirror drive unit with a signal for controlling folding/unfolding of a side-view mirror.

As another example, the processor 270 may provide a black box drive unit with a signal for controlling the black box.

As another example, the processor 270 may provide a trunk drive unit with a signal for controlling opening/closing of the trunk.

In some implementations, the geo-fence may include one or more geo-fences, such as a first geo-fence and a second geo-fence. In this case, the processor 270 may be configured to distinguish between an entrance and an exit of the user based on the first geo-fence and the second geo-fence. The processor 270 may provide a signal for controlling different functions of the vehicle 100 according to detecting an entrance or an exit of the user into or out of the first geo-fence and an entrance or an exit of the user into or out of the second geo-fence.

For example, when an entrance or an exit of the user is detected into or out of the first geo-fence, the processor 270 may provide a signal for controlling the power source, the steering, and the brake. In addition, when an entrance or ab exit of the user is detected into or out of the second geo-fence, the processor 270 may provide a signal for controlling the lamps, the air conditioner, the windows, the doors, the sunroof, and the suspension.

The particular functions that are controlled according to detecting an entrance and an exit of the user into or out of the first geo-fence or second geo-fence may be set according to user input. As such, the convenience apparatus 200 may provide adaptive and customized control of different functions of the vehicle based on different locations of a user outside the vehicle.

In some implementations, the processor 270 may adjust a range or a shape of a geo-fence according to user input received through the user input unit 240.

For example, the processor 270 may set the range of the geo-fence within the user sensing limit according to a user input.

As another example, the processor 270 may adjust the shape of the geo-fence according to a user input. For example, the processor 270 may set a circular or polygonal shaped geo-fence around the vehicle.

The processor 270 may set particular functions of the vehicle that are controlled based on detecting an entrance of the user into the geo-fence and particular functions of the vehicle that are controlled based on detecting an exit of the user from the geo-fence, for example, according to a user input received through the user input unit 240.

As an example, the processor 270 may set, according to a user input, functions such as Vehicle Start Support, Engine On, Lamp On, Air conditioning On, Open Window, Open Door, Open Sunroof, and Unfold Side-View Mirror as functions of the vehicle that are controlled based on detecting an entrance of the user into the geo-fence. As further examples, based on a user entering a region around the vehicle, the processor 270 may automatically control functions of the vehicle that would be controlled by the user when entering the vehicle.

As another example, the processor 270 may set, according to a user input, Parking Assistance, Engine Off, Lamp Off, Air Conditioning Off, Close Window, Close Door, Close Sunroof, and Fold Side-View Mirror as functions of the vehicle that are controlled based on detecting an exit of the user from the geo-fence. As further examples, based on a user exiting a region around the vehicle, the processor 270 may automatically control functions of the vehicle that would be controlled by the user when exiting the vehicle.

If an accessory performing a predetermined function is installed in the vehicle 100, the processor 270 may display, through a touchscreen, whether the function of the accessory can be performed based on detecting an entrance or an exit of the user into or out of a geo-fence. For example, based on detecting an entrance of the user into the geo-fence, the processor 270 may display whether the function of the accessory can be performed and receive user input for setting. As another example, based on detecting an exit of the user out of the geo-fence, the processor 270 may display whether the function of the accessory can be performed and receive user input for setting.

Herein, the accessory may refer to an additional device such as, for example, a front camera, a rear camera, a black box, a navigator, or a high-pass terminal which is installed in the vehicle 100, for example after the vehicle 100 is manufactured.

In some implementations, the processor 270 may adjust a range or a shape of the geo-fence according to a user's text input, scroll input, button input, or touch-and-drag input received through the touchscreen.

When the geo-fence includes a first geo-fence and a second geo-fence, the processor 270 may, according to a user input received through the user input unit 240, set the first geo-fence to detect an entrance of the user and set the second geo-fence to detect an exit of the user. For example, the processor 270 may set a first geo-fence that is used to detect an entrance of the user and a second geo-fence that is used to detect an exit of the user.

The processor 270 may display, on the touchscreen, a vehicle image corresponding to the vehicle 100. The processor 270 may set the first geo-fence such that an entrance or an exit of the user is detected based on the first geo-fence. In this case, the processor 270 may perform, through the touchscreen, a control operation such that a first geo-fence image corresponding to the first geo-fence is displayed around the vehicle image. In this case, the processor 270 may control the first geo-fence image to be displayed in a first color or in a first pattern.

The processor 270 may set the second geo-fence such that the entering or exiting user is detected based on the second geo-fence. In this case, the processor 270 may, through the touchscreen, perform a control operation such that a second geo-fence image corresponding to the second geo-fence is displayed around the vehicle image. In this case, the processor 270 may control the second geo-fence image to be displayed in a second color or in a second pattern.

In some implementations, an entrance of the user into the geo-fence may be detected through the user sensing unit 220 with the vehicle 100 being in a parked state. In this case, the processor 270 may provide a signal that secures a space for the user to enter the vehicle and preparing to start the vehicle.

In some implementations, in addition to controlling functions of the vehicle 100 based on a location or movements of a user relative to one or more geo-fences around the vehicle 100, the convenience apparatus 200 may control functions of the vehicle 100 further based on objects detected around the vehicle 100.

For example, consider a scenario in which with the vehicle 100 is vertically parked, for example, when the vehicle 100 is parked perpendicular or at an angle to the curb. Based on detecting an entrance of the user into the geo-fence through the user sensing unit 220, the processor 270 may, based on whether any objects are detected around the vehicle 100, conditionally provide a signal for controlling a door of the vehicle to be automatically opened. The detection of any objects may either cause the door to be opened or not to be opened, depending on properties of the object and/or properties of the user that are sensed.

As an example, in a state in which the vehicle 100 is vertically parked, based on the object sensing unit 230 detecting that an object is within a certain distance of the driver's seat of the vehicle 100, the processor 270 may provide a signal for controlling a door of the vehicle to be opened after the vehicle 100 is moved forward or backward.

As another example, based on the user sensing unit 220 detecting that the user is holding objects, such as luggage, the processor 270 may provide a signal for controlling an opening of the trunk of the vehicle 100.

As another example, in state in which the vehicle 100 parallel-parked, based on the user sensing unit 220 detecting an entrance of the user into the geo-fence, the processor 270 may provide a signal for controlling the vehicle to secure a space for starting driving and then rotate the steering wheel in a direction corresponding to the expected driving direction.

As another example, in a state in which the vehicle 100 is parked, based on the user sensing unit 220 detecting an entrance of the user into the geo-fence, the processor 270 may provide a signal for controlling at least one of air conditioning of the indoor space of the vehicle 100, at least one lamp included in the vehicle 100, the black box included in the vehicle 100, the sunroof of the vehicle 100 and the windows of the vehicle 100.

In some implementations, based on the camera module 221 detecting an entrance of the user into the geo-fence, a problem may occur wherein a signal transmitted from the smart key carried by the user may not be received through the smart key communication module. In this case, the processor 270 may be configured to output an alarm signal through the output unit 250, indicating that a smart key has not been detected in the vicinity of the user, and the user may not be in possession of the smart key.

If exit of the user from the geo-fence is sensed through the user sensing unit 220 with the vehicle 100 parked, the processor 270 may provide a signal for controlling at least one of air conditioning of the indoor space of the vehicle 100, at least one lamp included in the vehicle 100, the black box included in the vehicle 100, the sunroof of the vehicle 100, and/or the windows of the vehicle 100.

If exit of the user from the geo-fence is sensed through the user sensing unit 220 without parking of the vehicle 100 having been completed, the processor 270 may provide a signal for completing parking of the vehicle 100. If the object sensing unit 230 senses an object located on a parking path of the vehicle completing the parking operation, the processor 270 may provide a signal for performing a braking of the vehicle.

For example, if a parking space in which the vehicle will be vertically parked is narrow and there are objects positioned on the left and right sides of the parking space, the user (e.g., the driver) may exit before parking is completed. Thereafter, when the user is sensed to leave the geo-fence, the convenience apparatus 200 may provide a signal for completing parking, thereby eliminating inconvenience of parking in the narrow parking space.

The controller 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electric units for performing other functions.

The processor 270 may be controlled by the controller 170.

The interface unit 280 may receive various types of signals, information or data or transmit signals, information or data processed or generated by the processor 270. To this end, the interface unit 280 may perform data communication with the controller 170, the display apparatus 160, the sensing unit 125 and the vehicle drive unit 150 provided in the vehicle in a wired or wireless communication manner.

The interface unit 280 may receive navigation information through data communication with the controller 170, the display apparatus 160 or a separate navigation apparatus. Herein, the navigation information may include destination information, route information according to the destination, map information, or current vehicle location information, wherein the map information and the current vehicle location information are related to traveling of the vehicle. The navigation information may also include the location information about the vehicle on a road.

The interface unit 280 may receive sensor information from the controller 170 or the sensing unit 125.

Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, and information about whether or not it rains.

Such sensor information may be acquired from a heading sensor, a yaw sensor, a gyro sensor, a position module, a vehicle drive/reverse drive sensor, a wheel sensor, a vehicle speed sensor, a vehicle body tilt sensor, a battery sensor, a fuel sensor, a tire sensor, a steering sensor based on turning of the steering wheel, a vehicle interior temperature sensor, a vehicle interior humidity sensor, and a rain sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 280 may provide a signal to the controller 170 or the vehicle drive unit 150. Herein, the signal may be a control signal.

The power supply 290 may be controlled by the controller 170 to supply electric power necessary for operation of respective constituents. In particular, the power supply 290 may receive power from, for example, a battery in the vehicle.

FIGS. 5 and 6 are block diagrams illustrating examples of a camera module according to implementations of the present disclosure.

Referring to FIG. 5, a camera module 221, 231 may include a camera 401 and a camera processor 400.

As described above with reference to FIGS. 3A and 3B, the camera 401 may include a plurality of cameras.

The camera processor 400 may include an image preprocessor 410, a disparity calculator 420, an object detector 434, an object tracking unit 440, and an application unit 450.

The image preprocessor 410 may receive a plurality of images or a generated around view image from the camera 401 and perform preprocessing of the images.

Specifically, the image preprocessor 410 may perform noise reduction, rectification, calibration, color enhancement, color space conversion (CSC), interpolation and camera gain control for the plurality of images or the generated around view image. Thereby, a clearer image than the plurality of images captured by the camera 401 or the generated around view image may be acquired.

The disparity calculator 420 receives the plurality of images or generated around view image signal-processed by the image preprocessor 410, sequentially performs stereo matching upon the received plurality of images or generated around view image, and acquires a disparity map according to the stereo matching. For example, the disparity calculator 420 may acquire disparity information on the surroundings of the vehicle.

Herein, stereo matching may be performed in a pixel unit or a predetermined block unit of the images. The disparity map may refer to a map indicating numerical values representing binocular parallax information about the left and right images.

The segmentation unit 432 may perform segmentation and clustering in the images based on the disparity information from the disparity calculator 420.

Specifically, the segmentation unit 432 may separate the background from the foreground in at least one of the images based on the disparity information.

For example, a region of the disparity map which has disparity information less than or equal to a predetermined value may be calculated as the background and excluded. Thereby, the foreground may be separated from the background.

As another example, a region having disparity information greater than or equal to a predetermined value in the disparity map may be calculated as the foreground and the corresponding part may be excluded. Thereby, the foreground may be separated from the background.

By separating the foreground from the background based on the disparity information extracted based on the images, signal processing speed may be increased and signal-processing load may be reduced in the subsequent object detection operation.

The object detector 434 may detect an object based on an image segment from the segmentation unit 432.

For example, the object detector 434 may detect an object in at least one of the images based on the disparity information.

Specifically, the object detector 434 may detect an object in at least one of the images. For example, the object detector 434 may detect an object in the foreground separated through image segmentation.

Next, the object verification unit 436 may classify and verify the separated object.

To this end, the object verification unit 436 may use an identification technique employing a neural network, a support vector machine (SVM) technique, an identification technique based on AdaBoost using Haar-like features or the histograms of oriented gradients (HOG) technique.

Meanwhile, the object verification unit 436 may verify the detected object by comparing the detected object with objects stored in the memory 130.

For example, the object verification unit 436 may verify a nearby vehicle, a lane, a road surface, a signboard, a dangerous area, a tunnel, and the like which are positioned around the vehicle.

The object tracking unit 440 may track the verified object. For example, the object tracking unit 440 may sequentially perform verification of an object in the acquired images and calculation of the motion or motion vector of the verified object, thereby tracking movement of the object based on the calculated motion or motion vector. Thereby, the object tracking unit 440 may track a nearby vehicle, a lane, a road surface, a signboard, a hazard zone, a tunnel, and the like which are positioned around the vehicle.

FIG. 6 is another exemplary internal block diagram of the camera processor.

Referring to FIG. 6, the camera processor 400 of FIG. 6 has the same internal constituent units as those of the camera processor 400 of FIG. 5, but has a different signal processing sequence. Hereinafter, only the different signal processing sequence will be described.

The object detector 434 may receive a plurality of images or a generated around view image and detect an object in the plurality of images or generated around view image. In contrast with the example of FIG. 5, the object may be directly detected in the plurality of images or generated around view image rather than being detected in a segmented image based on the disparity information.

Next, the object verification unit 436 classifies and verifies an object detected and separated based on an image segment from the segmentation unit 432 and objects detected by the object detector 434.

To this end, the object verification unit 436 may use an identification technique employing a neural network, the support vector machine (SVM) technique, an identification technique based on AdaBoost using Haar-like features, or the histograms of oriented gradients (HOG) technique.

Figure 7A:
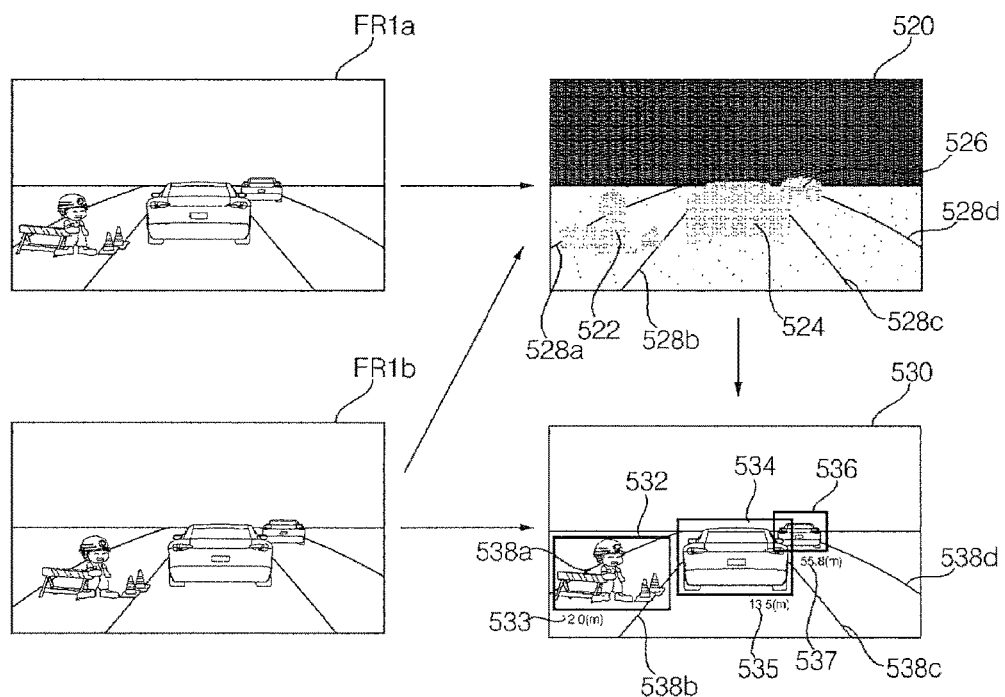
FIG. 7A is a diagram illustrating an example of an operation of an image processing camera processor based on images acquired in first and second frame intervals, respectively.

FIG. 7A illustrates operation of the image processing camera processor 400 based on images acquired in first and second frame intervals, respectively.

Referring to FIG. 7A, the camera 401 sequentially acquires images FR1$a$ and FR1$b$ in the first and second frame intervals.

The disparity calculator 420 in the camera processor 400 receives the images FR1$a$ and FR1$b$ signal-processed by the image preprocessor 410, and performs stereo matching on the received images FR1$a$ and FR1$b$, thereby acquiring a disparity map 520.

The disparity map 520 provides levels of disparities between the images FR1$a$ and FR1$b$. The disparity level may be inversely proportional to the distance to the vehicle.

When the disparity map is displayed, high brightness may be provided to a high disparity level and a low brightness may be provided to a low disparity level.

In the example of this figure, first to fourth lane lines 528a, 528b, 528c and 528d have corresponding disparity levels and a construction area 522, a first preceding vehicle 524 and a second preceding vehicle 526 have corresponding disparity levels in the disparity map 520.

The segmentation unit 432, the object detector 434, and the object verification unit 436 perform segmentation, object detection and object verification for at least one of the images FR1a and FR1b based on the disparity map 520.

In the example of the figure, object detection and verification are performed for the second image FR1b using the disparity map 520.

For example, object detection and verification may be performed for the first to fourth lane lines 538a, 538b, 538c and 538d, the construction area 532, the first preceding vehicle 534, and the second preceding vehicle 536 in the image 530.

Subsequently, the object tracking unit 440 may track the verified object in the acquired images.

Figure 7B:
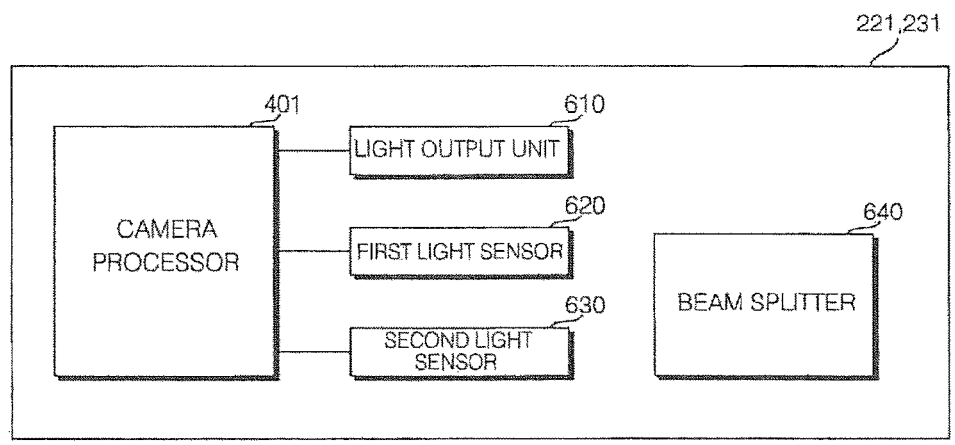
FIG. 7B is a block diagram illustrating an example of a camera module.

FIG. 7B is a block diagram illustrating a camera module according to an implementation.

Referring to FIG. 7B, the camera 195 may include a light output unit 610, a first light sensor 620, a second light sensor 630 and a beam splitter 640.

The light output unit 610 may output infrared light. The light output unit 610 may include a light source for generating infrared light and a lens.

The first light sensor 620 may process infrared light. The first light sensor 620 may convert infrared light into an electrical signal. The first light sensor 620 may include at least one photodiode. The first light sensor 620 may include a complimentary metal-oxide-semiconductor (CMOS) or a charge coupled device (CCD).

The second light sensor 630 may process visible light. The second light sensor 630 may convert visible light into an electrical signal. The second light sensor 630 may include at least one photodiode. The second light sensor 630 may include a complimentary metal-oxide-semiconductor (CMOS) or a charge coupled device (CCD).

The beam splitter 640 may split received light into infrared light and visible light. The beam splitter 640 may guide the infrared light split from the received light to the first light sensor 620. The beam splitter 640 may guide the visible light split from the rest of the light to the second light sensor 630.

When the camera 195 includes a planarity of cameras, each of the cameras may include the light output unit, the first light sensor, the second light sensor, and the beam splitter as described above.

The camera processor 400 may calculate the distance to an object based on Time of Flight (TOF) of infrared light sensed through the first light sensor 620. The camera processor 400 may perform computer vision-based image processing based on visible light sensed through the second light sensor 630. Computer vision-based image processing is performed as described above with reference to FIGS. 6 to 7A.

Figure 8:
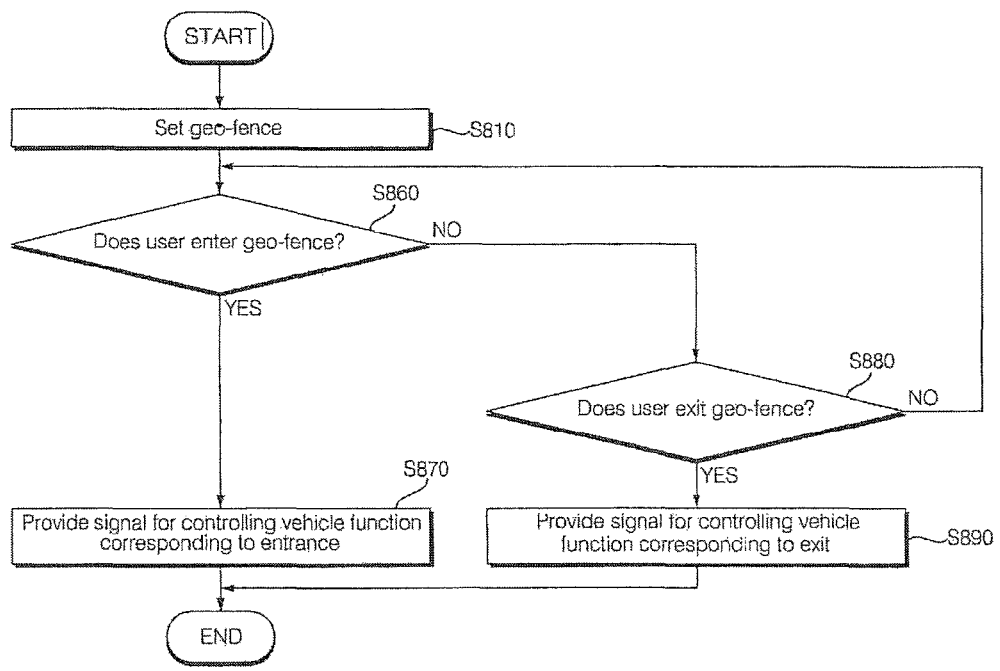
FIG. 8 is a flowchart illustrating an example of an operation of a convenience apparatus for vehicles.

FIG. 8 is a flowchart illustrating operation of a convenience apparatus for vehicles according to an implementation.

Referring to FIG. 8, the processor 270 may set a geo-fence according to a user input received through the user input unit 240 (S810). The geo-fence may include a plurality of geo-fences. The processor 270 may set the number, shape and range of geo-fences. The processor 270 may set various functions of the vehicle 100 according to sensing of the user entering the geo-fence. In addition, the processor 270 may set various functions of the vehicle 100 according to sensing of the user leaving the geo-fence.

The processor 270 may determine, through the user sensing unit 220, whether the user enters the geo-fence (S860).

When it is determined that the user enters the geo-fence, the processor 270 may provide a signal for controlling functions of the vehicle 100 corresponding to the entering user (S870). The signal may be provided to the vehicle drive unit 150.

The processor 270 may determine, through the user sensing unit 220, whether the user leaves the geo-fence (S880).

When it is determined that the user leaves the geo-fence, the processor 270 may provide a signal for controlling functions of the vehicle 100 corresponding to the leaving user (S890).

Figure 9:
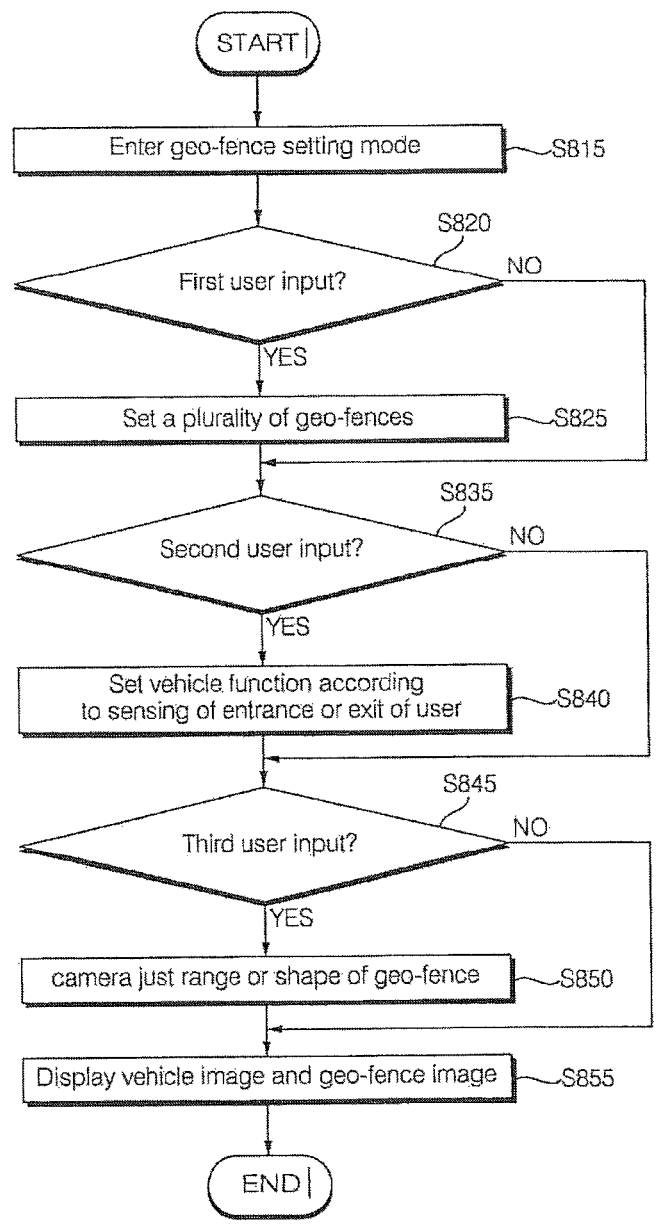
FIG. 9 is a flowchart illustrating an example of an operation of setting a geo-fence.

FIG. 9 is a flowchart illustrating an operation of setting a geo-fence according to an implementation.

The operations for setting a geo-fence as illustrated in FIG. 9 may be specific operations of step S810 of FIG. 8.

Referring to FIG. 9, the processor 270 may enter a geo-fence setting mode according to user input (S815).

The processor 270 may receive a first user input through the user input unit 240 (S820).

When the first user input is received, the processor 270 may set a plurality of geo-fences (S825).

The processor 270 may receive a second user input through the user input unit 240 (S835).

When the second user input is received, the processor 270 may set various functions of the vehicle according to the user entering or leaving a geo-fence (S840). If a plurality of geo-fences is set, the processor 270 may set various functions of the vehicle for the respective geo-fences.

The processor 270 may receive a third user input through the user input unit 240 (S845).

When a user input is received, the processor 270 may adjust the range or shape of a geo-fence (850). If a plurality of geo-fences is set, the processor 270 may adjust the range or shape of each of the geo-fences.

The processor 270 may display a vehicle image corresponding to the vehicle and a geo-fence image corresponding to a geo-fence on the display unit 251 (S855).

Figure 10:
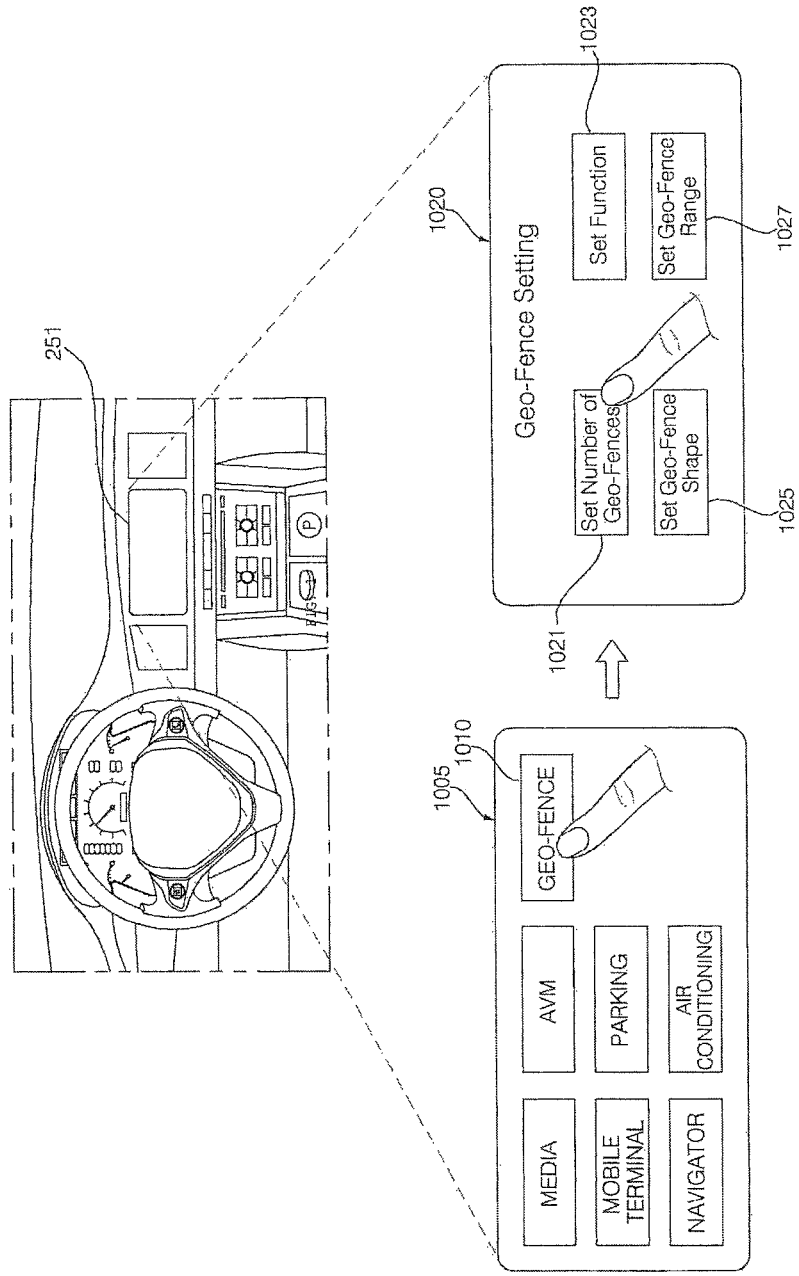
FIGS. 10 to 12 are diagrams illustrating examples of an operation of setting a geo-fence.
Figure 11:
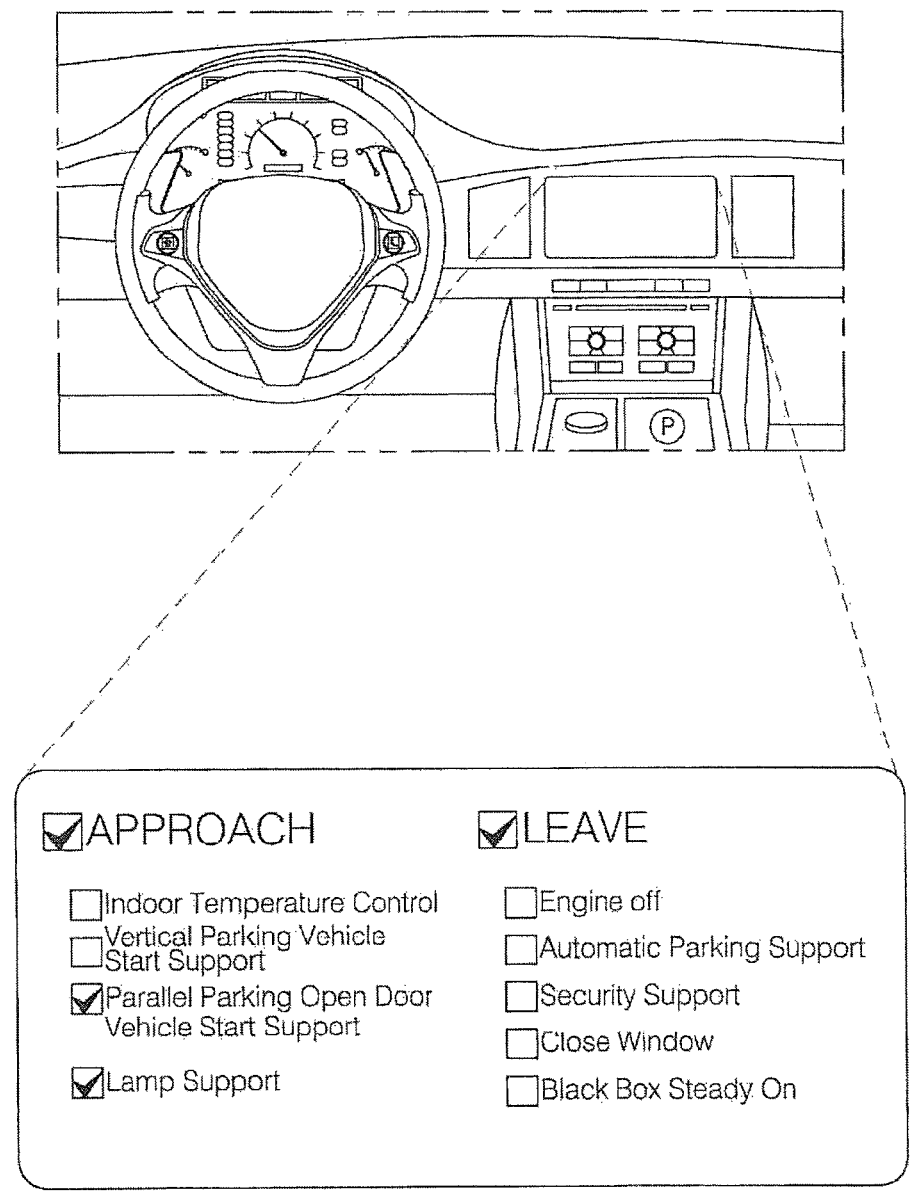
Figure 12:
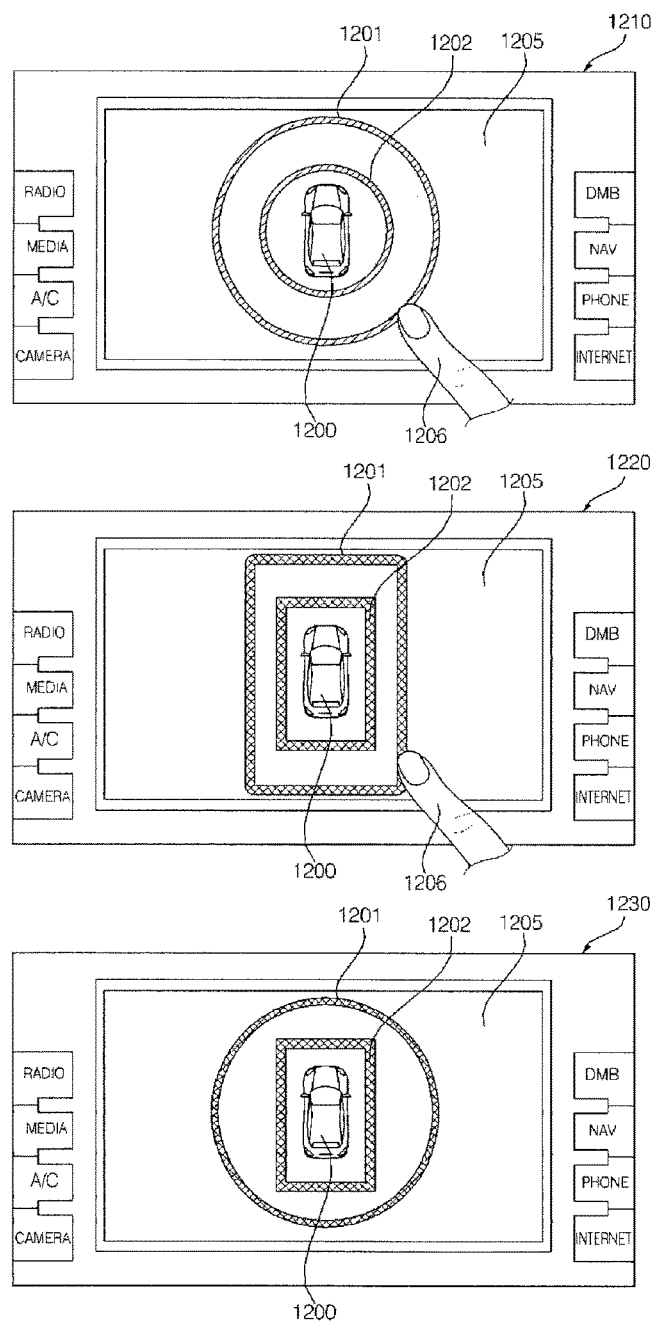

FIGS. 10 to 12 are views illustrating an operation of setting a geo-fence according to an implementation.

FIG. 10 illustrates an operation of entering a geo-fence setting mode according to an implementation.

Referring to FIG. 10, the processor 270 may display, through the display unit 251, a screen window 1005 allowing selection of various convenience functions of the vehicle. With the screen window 1005 displayed, the processor 270 may receive an input of selecting a geo-fence 1010. In this case, the processor 270 may enter the geo-fence setting mode.

In the geo-fence setting mode, the processor 270 may display a screen window 1020 allowing selection of a plurality of items for setting a geo-fence. For example, the plurality of items may include a number-of-geo-fences setting item 1021, a function setting item 1023, a geo-fence setting item 1025, and a geo-fence range setting item 1027.

The number-of-geo-fences setting item 1021 is an item for setting the number of geo-fences according to user input. One geo-fence or a plurality of geo-fences may be set according to the user input.

When a plurality of geo-fences is set, the processor 270 may match different functions of the vehicle with the respective geo-fences.

When a plurality of geo-fences is set, the processor 270 may set the respective geo-fences to correspond to entrance and exit of the user.

When a plurality of geo-fences is set, the processor 270 may set different shapes and ranges of the respective geo-fences.

When a plurality of geo-fences is set, the processor 270 may display geo-fence images corresponding to the respective geo-fences in different colors on the display unit 251.

The function setting item 1023 is an item for setting the function of the vehicle corresponding to entering or leaving a geo-fence according to user input.

The geo-fence setting item 1025 is a matter for setting the shape of a geo-fence according to user input.

The geo-fence range setting item 1027 is an item for setting the range of a geo-fence according to user input.

FIG. 11 illustrates an operation of setting a function corresponding to a geo-fence according to an implementation.

Referring to FIG. 11, the processor 270 may set a function of the vehicle matching entrance of the user into the geo-fence or exit of the user from the geo-fence according to user input.

As shown FIG. 11, when the function setting item 1023 (FIG. 10) is selected, the processor 270 may display a category of functions by matching the functions with entrance of the user into the geo-fence or exit of the user from the geo-fence.

In this implementation, the processor 270 may display a category of Air Conditioning, Vehicle Start Support, and Lamp Support which can be set by being matched with sensing of entrance of the user into the geo-fence.

The Air Conditioning is an item for controlling the vehicle indoor temperature to a comfortable temperature. For example, when the Air Conditioning is selected, the processor 270 may operate the air conditioner when the vehicle indoor temperature is high and operate the heater when the vehicle indoor temperature is low.

The Vehicle Start Support is an item for securing a space through which the user can enter the vehicle and prepared for driving. Specific functions of the Vehicle Start Support may be divided according to whether the vehicle is parked vertically or in parallel.

The Lamp Support is an item for turning on/off one of the lamps included in the vehicle depending on a situation.

In the configurable category, the processor 270 may select and set, according to user input, a function of the vehicle which will operate when entrance of the user into the geo-fences is sensed.

In addition, in this implementation, the processor 270 displays a category of Engine Off, Automatic Parking Support, Security Support, Close Window and Black Box Steady On which can be set by being matched with sensing of exit of the user from the geo-fence.

The Engine Off is an item for turning off the engine of the vehicle.

The Automatic Parking Support is an item for controlling automatic parking when the user exits the vehicle without parking having been completed.

The Security Support is an item for monitoring intrusion into the vehicle or damage to the vehicle after parking is completed.

The Close Window is an item for closing the windows.

The Black Box Steady On is an item for controlling the black box such that the function of the black box is performed even if the vehicle remains parked.

In the configurable category, the processor 270 may select and set, according to user input, a function of the vehicle which will operate when exit of the user from the geo-fences is sensed.

FIG. 12 illustrates an operation of setting the shape and range of a geo-fence according to an implementation.

Referring to FIG. 12, a plurality of geo-fences may be set according to user input.

The processor 270 may set the shape and range of a geo-fence according to a user input 1206 received through a touchscreen 1205.

The processor 270 may implement various input schemes through the touchscreen.

For example, the processor 270 may display a virtual keyboard for a text on the touchscreen when a user text input is received through the virtual keyboard, the processor 270 may set the shape and range of a geo-fence according to the text input.

For example, the processor 270 may display a scrollbar for scroll inputs on the touchscreen. When a scroll input is received through the scrollbar, the processor 270 may set the shape and range of a geo-fence according to the scroll input.

For example, the processor 270 may display a button for button input on the touchscreen. When button input is received through the button, the processor 270 may set the shape and range of a geo-fence according to the button input.

For example, when a touch and drag input is received for a geo-fence images 1201, 1202 while the geo-fence images 1201 and 1202 are displayed, the processor 270 may set the shape and range of the geo-fence according to the touch and drag input.

The shape of the geo-fences may be a circle shown in the section indicated by reference numeral 1210. Alternatively, the shape of the geo-fences may be a rectangle as shown in the section indicated by reference numeral 1220. Alternatively, the shape of a first geo-fence may be a rectangle and the shape of a second geo-fence may be a circle.

The processor 270 may set a geo-fence for sensing entrance of the user and a geo-fence for sensing exit of the user differently. For example, when the geo-fences include a first geo-fence and a second geo-fence, the processor 270 may set the first geo-fence to be used to sense entrance of the user and the second geo-fence to be used to sense exit of the user according to user input received through the user input unit 240.

The processor 270 may display a vehicle image 1200 corresponding to the vehicle 100 on the touchscreen. The processor 270 may set the first geo-fence to be used to sense entrance or exit of the user. In this case, the processor 270 may control the first geo-fence image 1201 corresponding to the first geo-fence to be displayed around the vehicle image 1200 through the touchscreen. In this case, as shown in the section indicated by reference numeral 1230, the processor 270 may control the first geo-fence image to be displayed in a first color.

The processor 270 may set the second geo-fence to be used to sense entrance or exit of the user. In this case, the processor 270 may control the second geo-fence image 1202 corresponding to the second geo-fence to be displayed around the vehicle image 1200 through the touchscreen. In this case, as shown in the section indicated by reference numeral 1230, the processor 270 may control the second geo-fence image to be displayed in a second color.

Figure 13:
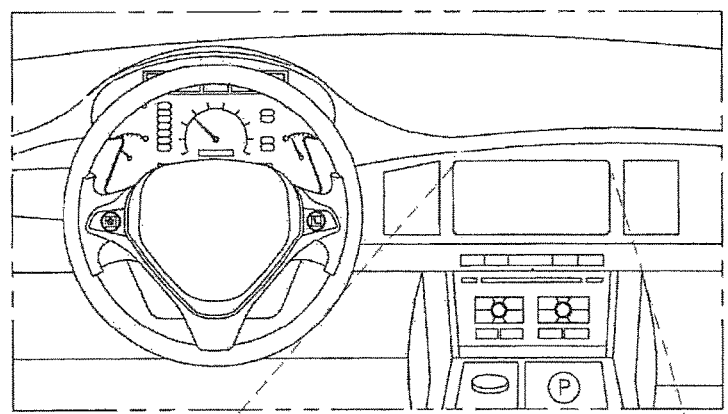
FIG. 13 is a diagram illustrating an example of an operation of setting a geo-fence when an accessory is provided.
Figure 13:
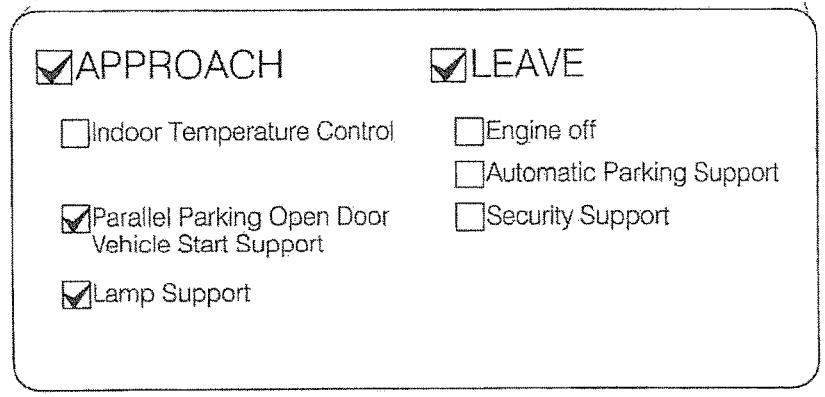

FIG. 13 is a view illustrating an operation of setting a geo-fence when an accessory is provided according to an implementation.

Referring to FIG. 13, various accessories may be installed in the vehicle 100. If an accessory performing a predetermined function is installed in the vehicle 100, the processor 270 may set the operation of the accessory by matching the operation with entrance or exit of the user into or from a geo-fence.

If an accessory performing a predetermined function is installed in the vehicle 100, the processor 270 may indicate, through the touchscreen, whether the accessory function is executable depending on whether entrance or exit of the user into or from the geo-fence is sensed. For example, the processor 270 may indicate whether the accessory function is executable depending on whether entrance of the user into the geo-fence is sensed, and receive a user input for setting. For example, the processor 270 may indicate whether the accessory function is executable depending on whether exit of the user from the geo-fence is sensed, and receive a user input for setting.

Herein, the accessory may refer to an additional device such as a front camera, a rear camera, a black box, a navigator, or a high-pass terminal which is installed in the vehicle 100, for example after the vehicle 100 is manufactured.

FIGS. 14 to 18 are views illustrating various operations of a vehicle performed when entrance or exit of a user into or from a geo-fence is sensed.

Figure 14:
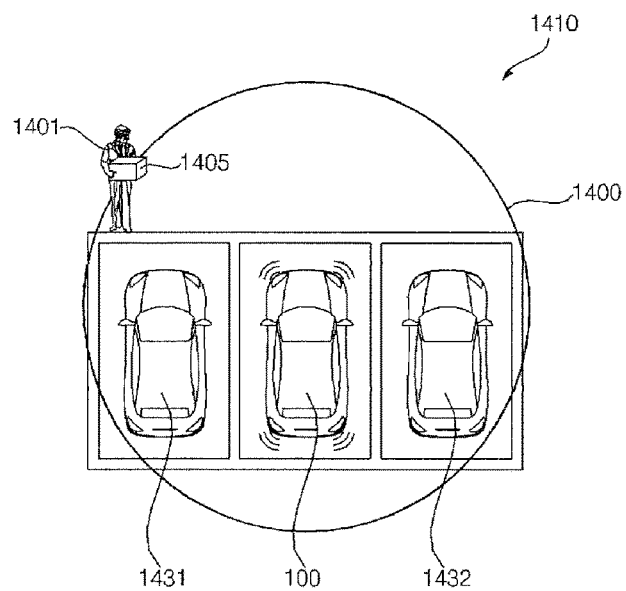
FIGS. 14 to 18 are diagrams illustrating examples of various operations of a vehicle performed when entrance or exit of a user into or from a geo-fence is sensed.
Figure 14:
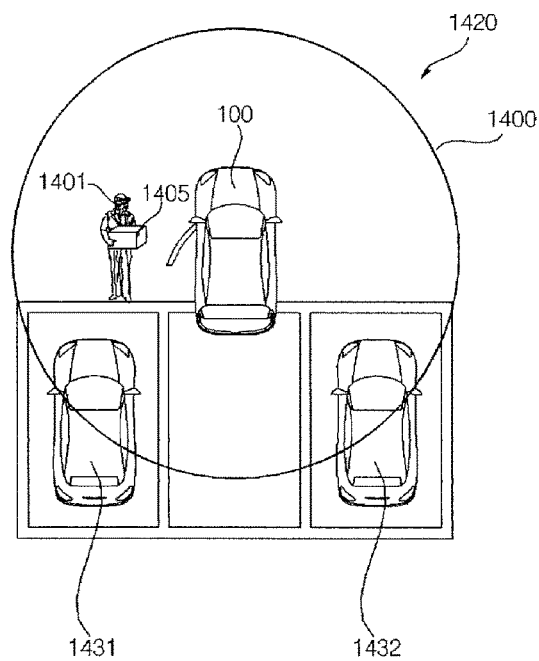

FIG. 14 illustrates a function of a vehicle performed when entrance of the user into a geo-fence is sensed with the vehicle parked vertically according to an implementation.

Referring to FIG. 14, with the vehicle 100 vertically parked, the user sensing unit 220 may detect a user 1401 entering a geo-fence 1400. Herein, vertical parking may include head-on parking and back-in parking.

When the user 1401 entering the geo-fence 1400 is detected, the processor 270 may perform as function of the vehicle corresponding to entrance of the user 1401. Herein, the function of the vehicle may be set according to user input.

The processor 270 may provide a signal for controlling execution of the function of the vehicle to the vehicle drive unit 150.

The processor 270 may perform the function of Vehicle Start Support. The processor 270 may provide a signal for securing a space allowing the user to enter the vehicle and preparing to start the vehicle.

The processor 270 may provide the door drive unit 157 with a signal for controlling a door of the vehicle to be opened.

If the object sensing unit 230 detects an object 1431 within a certain distance to the driver's seat of the vehicle 100 as shown in the figure, the processor 270 may provide the power source drive unit 151 and the door drive unit 157 with a signal for controlling the door to be opened after the vehicle 100 is moved forward or backward.

If luggage 1405 carried by the user is detected, the processor 270 may provide a trunk drive unit with a signal for controlling the trunk of the vehicle 100 to be opened.

The processor 270 may provide the lamp drive unit with a signal for controlling an auxiliary lamp (e.g., an emergence light) to flicker at a predetermined frequency.

The processor 270 may provide the air conditioning drive unit 155 with a signal for controlling the indoor temperature.

Figure 15:
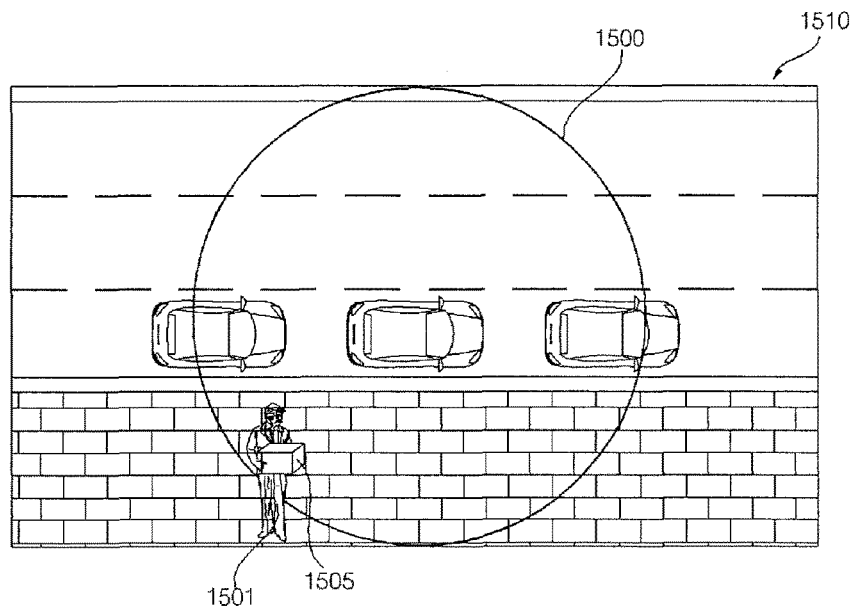
Figure 15:
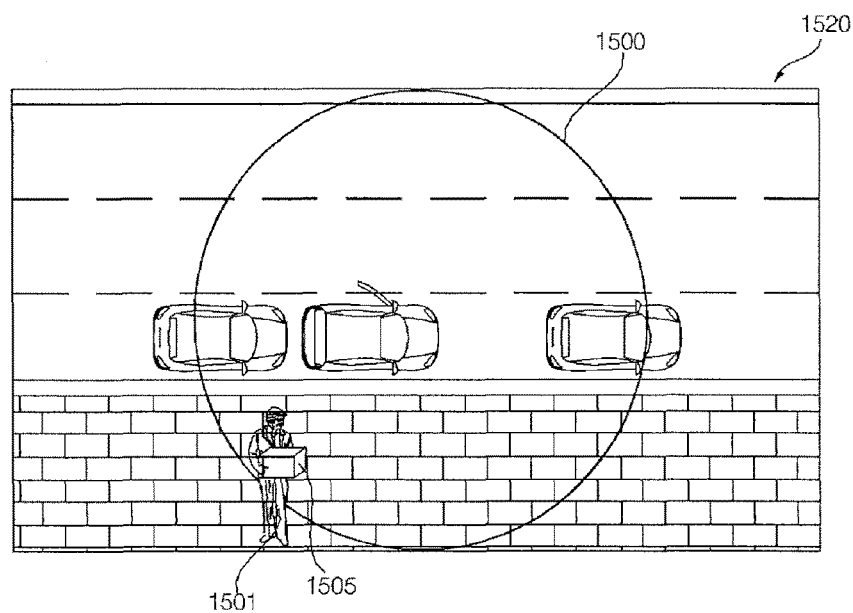

FIG. 15 illustrates a function of a vehicle performed when entrance of the user into a geo-fence is sensed with the vehicle parallel-parked according to an implementation.

Referring to FIG. 15, with the vehicle 100 parallel-parked, the user sensing unit 220 may detect a user 1501 entering a geo-fence 1500.

When the user 1501 entering the geo-fence 1500 is detected, the processor 270 may perform a function of the vehicle corresponding to entrance of the user 1501. Herein, the function of the vehicle may be set according to user input.

The processor 270 may provide a signal for controlling execution of the function of the vehicle to the vehicle drive unit 150.

The processor 270 may perform the function of Vehicle Start Support. The processor 270 may provide a signal for securing a space allowing the vehicle to start and preparing driving. For example, the driving in preparation operation may be an operation of rotating the steering wheel to a direction corresponding to the expected driving direction.

The processor 270 may provide the door drive unit 157 with a signal for controlling a door of the vehicle to be opened.

If luggage 1505 carried by the user is detected, the processor 270 may provide a trunk drive unit with a signal for controlling the trunk of the vehicle 100 to be opened.

The processor 270 may provide the lamp drive unit with a signal for controlling an auxiliary lamp (e.g., an emergency light) to flicker at a predetermined frequency.

The processor 270 may provide the air conditioning drive unit 155 with a signal for controlling the indoor temperature.

Figure 16:
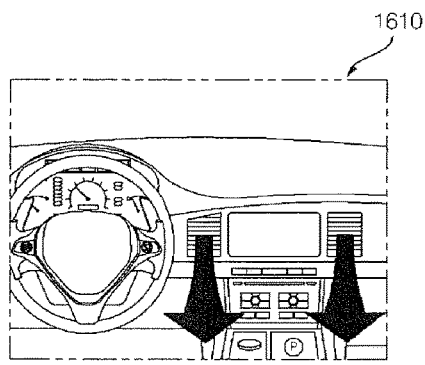
Figure 16:
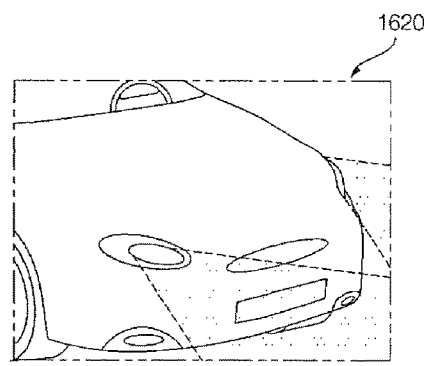
Figure 16:
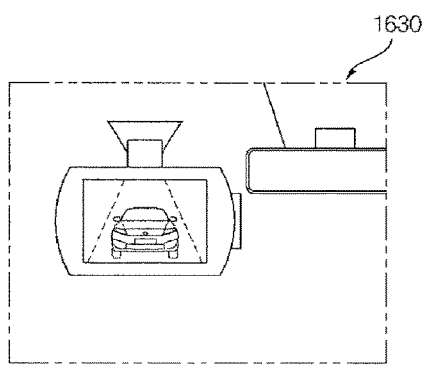
Figure 16:
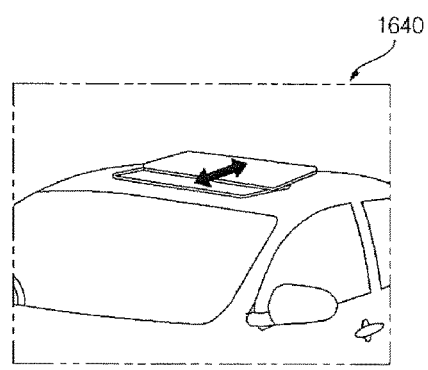
Figure 16:
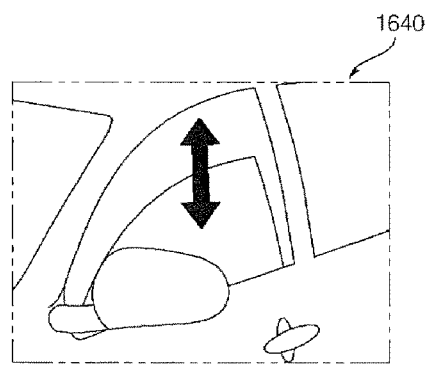

FIG. 16 illustrates various functions of the vehicle performed when entrance or exit of the user into a geo-fence is sensed.

Referring to FIG. 16, if entrance of the user into a geo-fence is sensed through the user sensing unit 220 with the vehicles 100 parked, the processor 270 may provide a signal for controlling at least one of air conditioning of the indoor space of the vehicle 100, at least one lamp included in the vehicle 100, the black box included in the vehicle 100, the sunroof of the vehicle 100 and the windows of the vehicle 100.

Specifically, as shown in the section indicated by reference numeral 1610, if entrance of the user into the geo-fence is sensed, the processor 270 may provide a signal to the air conditioning drive unit 155 to adjust the indoor air temperature of the vehicle 100.

As shown in the section indicated by reference numeral 1620, if entrance of the user into the geo-fence is sensed, the processor 270 may provide a signal to the lamp drive unit 154 to operate at least one of the lamps provided to the vehicle 100. For example, if entrance of the user into the geo-fence is sensed through the user sensing unit 220 with the vehicle 100 parked, the processor 270 may provide a signal to the lamp drive unit 154 to keep the emergency light turned on for a predetermined time.

As shown in the section indicated by reference numeral 1630, if entrance of the user into the geo-fence is sensed with the black box turned off, the processor 270 may provide a signal to a black box drive unit to turn on the black box.

As shown in the section indicated by reference numeral 1640, if entrance of the user into the geo-fence is sensed, the processor 270 may provide a signal to the sunroof drive unit 158 to open the sunroof.

As shown in the section indicated by reference numeral 1650, if entrance of the user into the geo-fence is sensed, the processor 270 may provide a signal to the window drive unit 156 to open a window.

If exit of the user from the geo-fence is sensed through the user sensing unit 220 with the vehicle 100 parked, the processor 270 may provide a signal for controlling at least one of air conditioning of the indoor space of the vehicle 100, at least one lamp included in the vehicle 100, the black box included in the vehicle 100, the sunroof of the vehicle 100 and the windows of the vehicle 100.

Specifically, as shown in the section indicated by reference numeral 1610, if exit of the user from the geo-fence is sensed, the processor 270 may provide a signal to the air conditioning drive unit 155 to turn off the air conditioner.

As shown in the section indicated by reference numeral 1620, if exit of the user from the geo-fence is sensed, the processor 270 may provide a signal to the lamp drive unit 154 to operate at least one of the lamps provided to the vehicle 100. For example, if exit of the user from the geo-fence is sensed through the user sensing unit 220 with the vehicle 100 parked, the processor 270 may provide a signal to the lamp drive unit 154 to turn on the headlights. As the headlights are turned on, visible light is provided to the user at night.

As shown in the section indicated by reference numeral 1630, if exit of the user from the geo-fence is sensed, the processor 270 may provide a signal to the black box drive unit to keep the black box turned on when the vehicle is parked.

As shown in the section indicated by reference numeral 1640, if exit of the user from the geo-fence is sensed, the processor 270 may provide a signal to the sunroof drive unit 158 to close the sunroof.

As shown in the section indicated by reference numeral 1650, if exit of the user from the geo-fence is sensed, the processor 270 may provide a signal to the window drive unit 156 to close a window.

Figure 17:
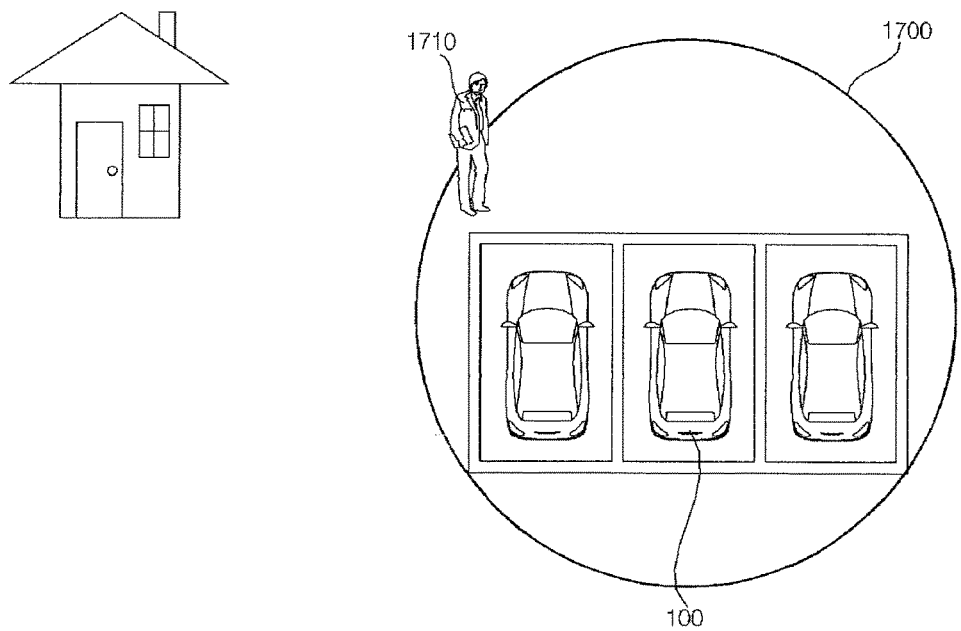

FIG. 17 illustrates an operation of outputting an alarm signal when the vehicle detects that the user is not carrying a smart key.

Referring to FIG. 17, the user sensing unit 220 may include a camera module 221 and a smart key communication module 222.

When entrance of the user into the geo-fence is sensed through the camera module 221, the smart key communication module may determine that it has not received any signal transmitted from the smart key carried by the user.

In this case, the processor 270 may output an alarm signal through the output unit 250, indicating that a smart key has not been detected and that the user may not be carrying the smart key. As such, the alarm may assist the user by allowing the user to recognize that the user does not have the smart key before reaching the vehicle 100.

Figure 18:
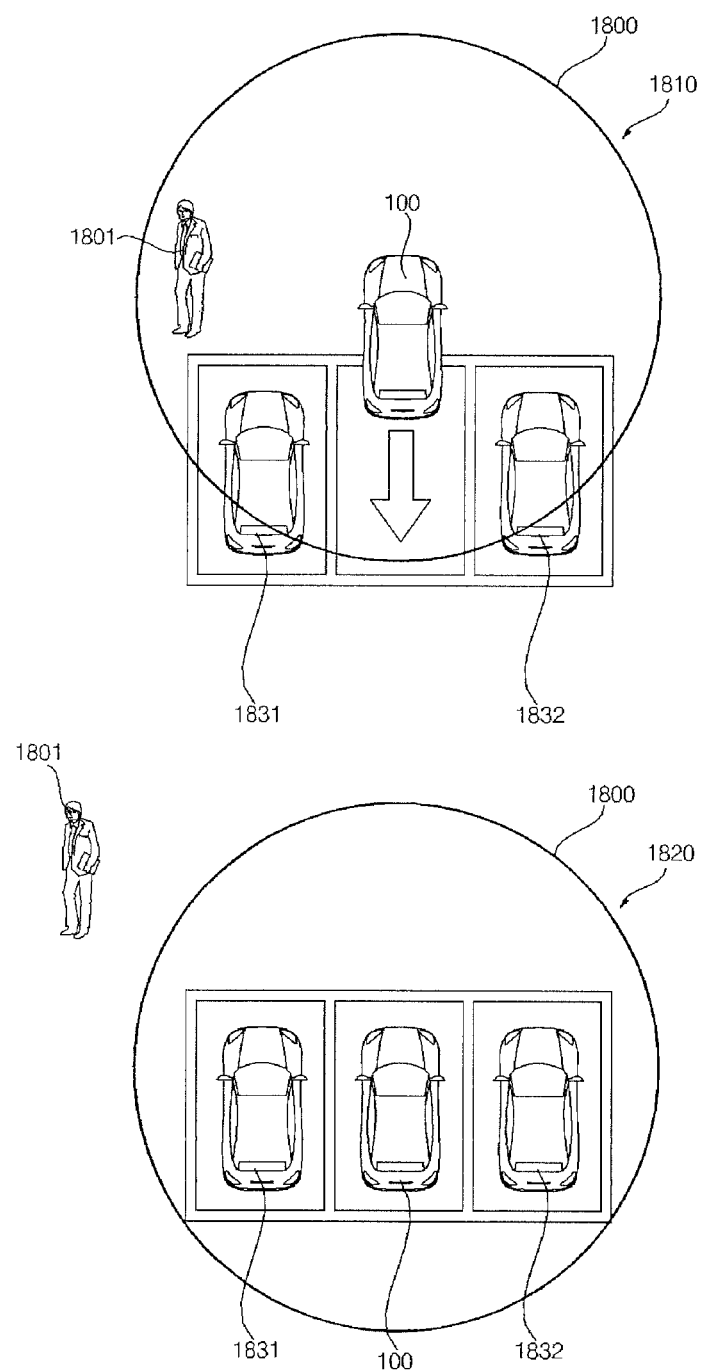

FIG. 18 illustrates an example of execution of the automatic parking function when exit of the user from the geo-fence is sensed.

Referring to FIG. 18, exit of a user 1801 from a geo-fence 1800 may be sensed through the user sensing unit 220 without parking of the vehicle 100 having been completed. In this case, the processor 270 may provide a signal to complete an automatic parking operation of the vehicle 100. For example, the processor 270 may provide a signal to the power source drive unit 151, the steering drive unit 152, and the brake drive unit 153.

If an object on a parking path for completing parking is sensed through the object sensing unit 230, the processor 270 may provide a signal for braking the vehicle.

As shown in the scenario of FIG. 18 indicated by reference numeral 1810, a situation may occur whereby if a parking space in which the vehicle will be vertically parked is narrow and there are objects 1831 and 1832 positioned on the left and right sides of the parking space, the user (e.g., the driver) 1801 may exit before parking is completed.

In such cases, when the user is sensed to leave the geo-fence, the convenience apparatus 200 of the vehicle 100 may provide a signal to complete an automatic parking operation of the vehicle 100, as shown in the portion of FIG. 18 indicated by reference numeral 1820.

As automatic parking is performed in a narrow parking space that is too small for the user to exit the vehicle, user inconvenience may be eliminated when the user exits the vehicle.

As is apparent from the above description, the present disclosure has at least one of the following effects.

First, when a user enters a geo-fence, the vehicle is prepared to start such that the driver can drive the vehicle upon entering the vehicle.

Second, when the user enters the geo-fence, an environment proper for driving is created to provide a convenient driving environment to the user.

Third, the user is allowed to set various functions related to the geo-fence. Thereby, personalized convenience may be provided for the user.

Effects of the present disclosure are not limited to the aforementioned effects, and other effects of the present disclosure which are not mentioned above will become apparent to those having ordinary skill in the art from the claims.

Implementations described herein may be implemented as computer-readable code on a medium on which a program is recorded. The computer-readable medium includes all kinds of recording devices in which data readable by a computer system can be stored. Examples of the computer-readable medium include a hard disk drive (HDD), a solid state drive (SSD), silicon disk drive (SDD), ROM, RAM, CD-ROM, magnetic tape, floppy disk, and optical data storage. Alternatively, implementations may be implemented in the form of a carrier wave (e.g., transmission over the Internet). In addition, the computer may include the processor 270 or the controller 170. Although the examples above have been disclosed for illustrative purposes, those skilled in the art will appreciate that various modifications, additions and substitutions are possible, without departing from the scope and spirit of the invention as disclosed in the accompanying claims.

What is claimed is:

1. A convenience apparatus for a vehicle, the convenience apparatus comprising:
 a user sensing unit configured to sense a user located outside the vehicle;
 an object sensing unit configured to sense an object other than the user located outside the vehicle; and
 at least one processor configured to:
  determine at least one geo-fence established around the vehicle;
  determine, based on the user sensing unit sensing the user outside the vehicle, whether an entrance event or an exit event of the user has occurred based on the at least one geo-fence around the vehicle;
  determine that the object sensing unit has sensed an object outside the vehicle; and
  based on the determination that the object sensing unit has sensed the object outside the vehicle and based on the determination that the entrance event or the exit event of the user has occurred, provide a signal that controls at least one operation of the vehicle according to the entrance event or the exit event of the user, wherein the at least one geo-fence comprises a virtual perimeter around the vehicle corresponding to a real-world geographic area, and wherein the at least one processor is further configured to:
 determine, through the user sensing unit, that the user enters the at least one geo-fence;
 provide, based on the determination that the user enters the at least one geo-fence, a first signal for controlling operations of the vehicle corresponding to the entering user;
 determine, through the user sensing unit, that the user exits the at least one geo-fence; and
 provide, based on the determination that the user exits the at least one geo-fence, a second signal for controlling operations of the vehicle corresponding to the exiting user,
wherein the at least one processor is further configured to:
 determine, through the user sensing unit, that the entrance event of the user has occurred in a state in which the vehicle is parked; and
 based on the determination that the entrance event of the user has occurred in the state in which the vehicle is parked, provide a signal that controls the vehicle to secure an exterior space around the vehicle that allows the user to enter the vehicle, and
wherein the at least one processor is further configured to:
 determine, through the user sensing unit, that an entrance event of the user has occurred in a state in which the vehicle is parallel-parked; and
 based on the determination that the entrance event of the user has occurred in the state in which the vehicle is parallel-parked, provide a signal that controls a steering wheel of the vehicle to rotate in a direction corresponding to an expected driving direction.

2. The convenience apparatus according to claim 1, wherein the at least one geo-fence comprises a first geo-fence and a second geo-fence, and
 wherein the at least one processor is configured to determine whether the entrance event or the exit event of the user has occurred based on the at least one geo-fence around the vehicle by:
  determining that the entrance event of the user has occurred based on detecting that the user has crossed the first geo-fence; and
  determining that the exit event of the user has occurred based on detecting that the user has crossed the second geo-fence, and
 wherein the at least one processor is configured to provide the signal that controls the at least one operation of the vehicle according to the entrance event or the exit event of the user by:
  providing the first signal that controls a first operation of the vehicle based on a determination that the entrance event of the user has occurred as a result of the user having crossed the first geo-fence; and
  providing the second signal that controls a second operation of the vehicle based on a determination that the exit event of the user has occurred as a result of the user having crossed the second geo-fence.

3. The convenience apparatus according to claim 1, further comprising:
 a user input unit configured to receive a user input, wherein the at least one processor is further configured to adjust a range or a shape of the at least one geo-fence according to the user input received through the user input unit.

4. The convenience apparatus according to claim 3, wherein the at least one processor is further configured to, based on the user input received through the user input unit, set a first function of the vehicle that is to be controlled based on detecting the entrance event of the user, and set a second function of the vehicle that is to be controlled based on detecting the exit event of the user.

5. The convenience apparatus according to claim 4, wherein:
 the user input unit comprises a touchscreen, and
 the at least one processor is further configured to indicate, through the touchscreen and based on an accessory component being provided in the vehicle that performs a predetermined function:
  whether the predetermined function of the accessory component is controllable according to a detection of the entrance event or the exit event of the user.

6. The convenience apparatus according to claim 3, wherein:
 the user input unit comprises a touchscreen, and
 the at least one processor is further configured to adjust a range or a shape of the at least one geo-fence according to a text input, a scroll input, a button input, or a touch-and-drag input received through the touchscreen.

7. The convenience apparatus according to claim 6, wherein:
 the at least one geo-fence comprises a first geo-fence and a second geo-fence, and
 the at least one processor is further configured to set, according to the received user input, the entrance event of the user to correspond to the first geo-fence, and set the exit event of the user to correspond to the second geo-fence.

8. The convenience apparatus according to claim 1, further comprising a touchscreen, wherein:
 the at least one geo-fence comprises a first geo-fence and a second geo-fence, and
 the at least one processor is further configured to:
  display, on the touchscreen, a vehicle image corresponding to the vehicle;
  based on detecting an entrance event of the user for the first geo-fence, control a first geo-fence image corresponding to the first geo-fence to be displayed around the vehicle image; and
  based on detecting an exit event of the user for the second geo-fence, control a second geo-fence image corresponding to the second geo-fence to be displayed around the vehicle image.

9. The convenience apparatus according to claim 8, wherein the at least one processor is further configured to control the first geo-fence image to be displayed in a first color and the second geo-fence image to be displayed in a second color.

10. The convenience apparatus according to claim 1, wherein the at least one processor is further configured to:
 determine, through the user sensing unit, that the entrance event of the user has occurred in the state in which the vehicle is vertically-parked; and
 based on the determination that the entrance event of the user has occurred in the state in which the vehicle is vertically-parked, provide the signal that controls an opening operation of a door of the vehicle.

11. The convenience apparatus according to claim 1, wherein the at least one processor is further configured to:
   determine, through the object sensing unit, that an object is within a first distance from a driver's seat of the vehicle; and
   based on the determination that the object is within the first distance from the driver's seat of the vehicle, provide the at least one signal that controls the vehicle to provide the exterior space around the vehicle by controlling the vehicle to move in a forward direction or a backward direction, and that controls an opening operation of a door of the vehicle after the vehicle has been moved in the forward direction or the backward direction.

12. The convenience apparatus according to claim 10, wherein the at least one processor is further configured to:
   determine, through the user sensing unit, that the user is carrying luggage; and
   based on the determination that the user is carrying luggage, provide a signal that controls an opening operation of a trunk of the vehicle.

13. The convenience apparatus according to claim 1, wherein the at least one processor is further configured to:
   determine, through the user sensing unit, that the entrance event of the user has occurred in the state in which the vehicle is parked; and
   based on the determination that the entrance event of the user has occurred in the state in which the vehicle is parked, provide a signal that controls at least one of a lamp provided in the vehicle, a black box provided in the vehicle, a sunroof of the vehicle, or a window of the vehicle.

14. The convenience apparatus according to claim 1, further comprising:
   an output unit:
   wherein the user sensing unit comprises:
      a camera module configured to sense the entrance event or the exit event of the user based on a captured image of the user; and
      a smart key communication module configured to sense the entrance event or the exit event of the user based on communication with a smart key carried by the user,
   wherein the at least one processor is further configured to:
      determine, based on the image of the user captured by the camera module, that the entrance event of the user has occurred;
      determine, through the smart key communication module, that a radio signal has not been received from a smart key carried by the user; and
      based on the determination that the entrance event of the user has occurred and that a radio signal has not been received from a smart key carried by the user, output an alarm signal through the output unit.

15. The convenience apparatus according to claim 1, wherein the at least one processor is further configured to:
   determine, through the user sensing unit, that an exit event of the user has occurred in a state in which a parking operation of the vehicle has not yet completed; and
   based on the determination that the exit event of the user has occurred in the state in which the parking operation of the vehicle has not yet completed, provide a signal that controls the vehicle to complete the parking operation.

16. The convenience apparatus according to claim 15, wherein the at least one processor is further configured to:
   determine, through the object sensing unit, that an object is located along a parking path of the parking operation of the vehicle; and
   based on the determination that an object is located along the parking path of the parking operation of the vehicle, provide a signal for performing a braking operation of the vehicle.

17. A vehicle comprising the convenience apparatus according to claim 1.

* * * * *